US011118729B2

(12) United States Patent
Zebarjad et al.

(10) Patent No.: US 11,118,729 B2
(45) Date of Patent: Sep. 14, 2021

(54) ADJUSTABLE COUNTERBALANCING DISPLAY SUPPORT

(71) Applicant: Teknion Limited, Toronto (CA)

(72) Inventors: Hamid Zebarjad, Richmond Hill (CA); Adam Sinclair, Mount Albert (CA); Yixin Chen, Toronto (CA); Stefan Spörl, Munich (DE)

(73) Assignee: Teknion Limited, Toronto (CA)

( * ) Notice: Subject to any disclaimer, the term of this patent is extended or adjusted under 35 U.S.C. 154(b) by 304 days.

(21) Appl. No.: 15/977,201

(22) Filed: May 11, 2018

(65) Prior Publication Data

US 2018/0356031 A1     Dec. 13, 2018

Related U.S. Application Data

(60) Provisional application No. 62/517,485, filed on Jun. 9, 2017.

(51) Int. Cl.
*F16M 13/02* (2006.01)
*F16M 11/24* (2006.01)
(Continued)

(52) U.S. Cl.
CPC .......... *F16M 13/022* (2013.01); *F16M 11/10* (2013.01); *F16M 11/105* (2013.01);
(Continued)

(58) Field of Classification Search
CPC .. F16M 13/022; F16M 11/24; F16M 11/2014; F16M 11/105; F16M 11/10;
(Continued)

(56) References Cited

U.S. PATENT DOCUMENTS 1,284,776 A  *  11/1918  Richard .................... A47B 3/00
                                                              108/99
2,090,439 A  *   8/1937  Carwardine ........... F16M 11/10
                                                              248/160
(Continued)

FOREIGN PATENT DOCUMENTS

DE        3042778 A1  *  5/1982    ........... F16M 11/242
EP        0129361 A2  *  12/1984   ......... F16M 11/2092
(Continued)

OTHER PUBLICATIONS

Document relating to International Application No. PCT/KR2008/004717, Publication No. WO2009088139A1, dated Mar. 17, 2009 (Written opinion of the International Search Authority).
(Continued)

*Primary Examiner* — Kimberly T Wood
(74) *Attorney, Agent, or Firm* — Bereskin & Parr LLP/S.E.N.C.R.L., s.r.l.

(57) ABSTRACT

An apparatus for supporting a display in a plurality of positions between a lower position and an upper position has a base support, a display support member, and a linkage assembly. The linkage assembly has a first link member, a second link member, and a tension spring. In the lower position, the display bracket is below an upper end of the base support, and in the upper position, the display bracket is above the upper end of the base support. In each of the plurality of positions, a vertical component of an upward force exerted on the display support member by the linkage assembly is substantially constant.

30 Claims, 15 Drawing Sheets

(51) Int. Cl.
*F16M 11/20* (2006.01)
*F16M 11/10* (2006.01)
*G06F 1/16* (2006.01)

(52) U.S. Cl.
CPC ..... *F16M 11/2014* (2013.01); *F16M 11/2092* (2013.01); *F16M 11/24* (2013.01); *F16M 2200/04* (2013.01); *F16M 2200/041* (2013.01); *F16M 2200/063* (2013.01); *F16M 2200/065* (2013.01); *G06F 1/1601* (2013.01)

(58) Field of Classification Search
CPC ........ F16M 11/2092; F16M 2200/063; F16M 2200/065; F16M 2200/041; F16M 2200/04; G06F 1/1601
USPC ...... 248/284.1, 274.1, 372.1, 917, 919, 920, 248/921, 922, 923; 361/679.02, 679.06, 361/679.07
See application file for complete search history.

(56) References Cited

U.S. PATENT DOCUMENTS

| | | | | |
|---|---|---|---|---|
| 2,941,776 | A * | 6/1960 | Lauterbach | F16M 11/10 248/280.11 |
| 3,041,034 | A * | 6/1962 | Wilkinson | F16M 11/10 248/284.1 |
| 3,226,073 | A * | 12/1965 | Jacobsen | F16M 11/2092 248/586 |
| 3,409,261 | A * | 11/1968 | Leporati | F16M 13/02 248/586 |
| 3,417,953 | A * | 12/1968 | Hillquist | F16M 11/2092 248/284.1 |
| 3,667,714 | A * | 6/1972 | Ziaylek | A62C 13/78 248/284.1 |
| 3,820,752 | A * | 6/1974 | Oram | F16M 11/048 248/284.1 |
| 3,973,748 | A * | 8/1976 | Nagasaka | F16M 11/046 248/571 |
| 4,208,028 | A * | 6/1980 | Brown | F16M 13/04 224/185 |
| 4,266,747 | A * | 5/1981 | Souder, Jr. | F16M 11/14 248/123.11 |
| 4,447,031 | A * | 5/1984 | Souder, Jr. | F16M 11/126 248/281.11 |
| 5,170,975 | A * | 12/1992 | Chadwick | F16M 11/10 248/284.1 |
| 5,340,072 | A * | 8/1994 | Halbirt | A61G 15/16 248/279.1 |
| 5,713,549 | A * | 2/1998 | Shieh | F16M 11/18 248/284.1 |
| 6,012,693 | A * | 1/2000 | Voeller | F16M 11/048 248/279.1 |
| 6,769,657 | B1 * | 8/2004 | Huang | F16M 11/10 248/278.1 |
| D537,323 | S | 2/2007 | Saez | |
| 7,412,776 | B2 * | 8/2008 | Iikubo | A61B 8/4218 248/280.11 |
| 7,562,851 | B2 * | 7/2009 | Hein | F16M 11/2014 248/276.1 |
| 7,703,473 | B1 * | 4/2010 | Hurley | F16K 31/46 137/343 |
| 7,726,616 | B2 | 6/2010 | Zhang et al. | |
| 7,810,773 | B2 * | 10/2010 | Chi | F16M 11/2064 248/278.1 |
| 8,328,151 | B2 | 12/2012 | Gwag | |
| 8,342,467 | B2 * | 1/2013 | Stachowski | A61B 90/50 248/280.11 |
| 8,366,060 | B2 * | 2/2013 | Hung | F16M 11/041 248/124.1 |
| 8,585,001 | B2 * | 11/2013 | Huang | F16M 11/24 248/284.1 |
| 8,801,319 | B2 * | 8/2014 | Brown | F16M 11/2014 403/62 |
| 8,899,540 | B2 * | 12/2014 | Honsberger | E05F 1/1075 248/281.11 |
| 8,960,632 | B2 * | 2/2015 | Fallows | F16M 11/2092 248/575 |
| 9,033,292 | B2 * | 5/2015 | Lu | F16M 11/2014 248/123.11 |
| 9,103,489 | B2 | 8/2015 | Gwag | |
| 9,125,502 | B2 | 9/2015 | Gwag | |
| 9,277,812 | B2 * | 3/2016 | Bennett | F16M 11/12 |
| 9,565,930 | B2 | 2/2017 | Gwag | |
| 9,657,889 | B1 * | 5/2017 | Chumakov | F16M 11/2014 |
| 2002/0066843 | A1 * | 6/2002 | Oddsen, Jr. | F16M 11/2014 248/282.1 |
| 2002/0126110 | A1 * | 9/2002 | Bowron | F16M 11/10 345/204 |
| 2003/0075653 | A1 * | 4/2003 | Li | F16M 11/24 248/274.1 |
| 2003/0075658 | A1 * | 4/2003 | Beissel, Jr. | F16M 11/10 248/284.1 |
| 2004/0021051 | A1 * | 2/2004 | Chiu | F16M 11/2021 248/371 |
| 2004/0245419 | A1 * | 12/2004 | Sweere | F16M 11/2064 248/276.1 |
| 2005/0121577 | A1 * | 6/2005 | Oddsen, Jr. | F16M 11/10 248/225.11 |
| 2005/0121578 | A1 * | 6/2005 | Asamarai | F16M 11/2064 248/284.1 |
| 2005/0284991 | A1 | 12/2005 | Saez | |
| 2006/0060735 | A1 * | 3/2006 | Oddsen, Jr. | F16M 11/105 248/278.1 |
| 2008/0173777 | A1 * | 7/2008 | Yamamoto | A47B 21/0314 248/274.1 |
| 2008/0265107 | A1 | 10/2008 | Saez | |
| 2009/0166501 | A1 * | 7/2009 | Wang | F16M 11/10 248/419 |
| 2010/0127144 | A1 * | 5/2010 | Lange | F16M 11/2014 248/284.1 |
| 2011/0147546 | A1 | 6/2011 | Monsalve et al. | |
| 2011/0260017 | A1 | 10/2011 | Monsalve et al. | |
| 2013/0112828 | A1 * | 5/2013 | Sapper | F16M 13/022 248/274.1 |
| 2013/0242179 | A1 * | 9/2013 | Huang | F16M 11/10 348/373 |
| 2018/0142519 | A1 * | 5/2018 | Jones | E21B 11/005 |

FOREIGN PATENT DOCUMENTS

| | | |
|---|---|---|
| KR | 1020050107285 A | 11/2005 |
| KR | 1020070082792 A | 8/2007 |
| KR | 1020070097737 A | 10/2007 |
| WO | 2009088139 A1 | 7/2009 |

OTHER PUBLICATIONS

Document relating to International Application No. PCT/KR2008/004717, Publication No. WO2009088139A1, dated Jul. 13, 2010 (International Preliminary Report on Patentability).

* cited by examiner

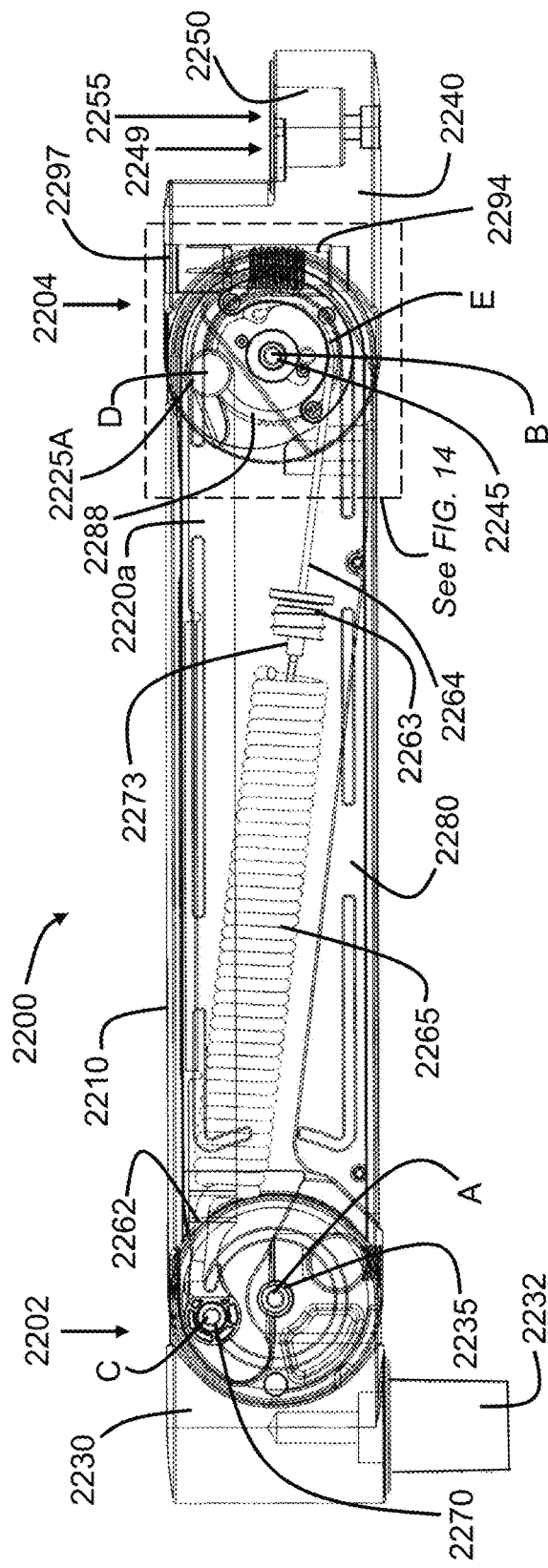
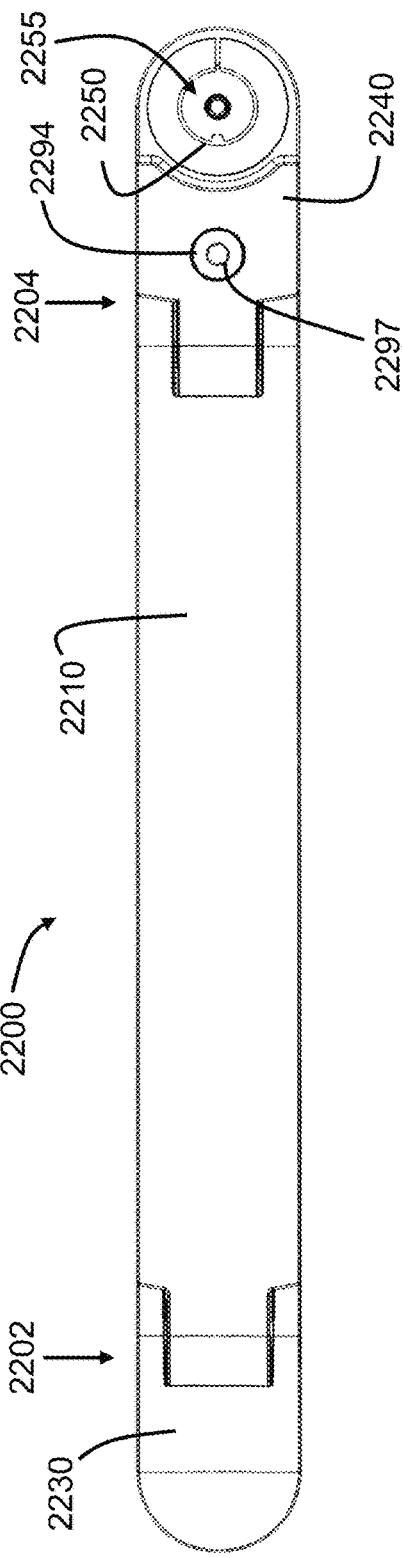
FIG. 12
FIG. 13

ADJUSTABLE COUNTERBALANCING DISPLAY SUPPORT

FIELD OF THE INVENTION

This application relates generally to a display support, and more specifically to an adjustable counterbalancing support arm for supporting a display.

INTRODUCTION

Display or monitor supports are well known. Such supports are commonly used, for example, to support a display of a computing device above a furniture piece, such as a desk or other worksurface.

U.S. Pat. No. 8,328,151 discloses an arm stand for a display that includes a rotary link unit that can purportedly maintain a stationary state of a display at any position within a rotating trajectory range of about 90 degrees between a generally vertical position and a generally horizontal position.

SUMMARY

The following summary is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one broad aspect, there is provided an apparatus for supporting a display in a plurality of positions between a lower position and an upper position, the apparatus being removably securable to a furniture piece, the apparatus comprising: a base support having a lower end and an upper end, the lower end being securable to the furniture piece; a display support member having a bracket configured to be secured to the display; and a linkage assembly having a first end coupled to the upper end of the base support and a second end coupled to the display support member, the linkage assembly comprising: a first link member having a first end rotationally coupled to the upper end of the base support and rotatable about a first horizontal link axis, and a second end rotationally coupled to the display support member and rotatable about a second horizontal link axis; a second link member having a first end rotationally coupled to the upper end of the base support and rotatable about a third horizontal link axis positioned above the first link axis, and a second end rotationally coupled to the display support member and rotatable about a fourth horizontal link axis positioned above the second link axis; wherein the third link axis is offset from the first link axis towards the first end of the first link member, and wherein the fourth link axis is offset from the third link axis towards the first end of the first link member, and a tension spring having a first end rotationally coupled to the upper end of the base support and rotatable about the third link axis, and a second end rotationally coupled to the display support member and rotatable about a fifth horizontal link axis positioned below the second link axis and offset from the second link axis towards the second end of the first link member; wherein, in the lower position, the display support member is below the upper end of the base support, and the first and second ends of the spring are separated by a first distance, wherein, in the upper position, the display support member is above the upper end of the base support, and the first and second ends of the spring are separated by a second distance that is less than the first distance, and wherein, in each of the plurality of positions, a vertical component of an upward force exerted on the display support member by the linkage assembly is substantially constant.

In some embodiments, when viewed from a plane orthogonal to the fourth link axis, the fourth link axis, the second link axis, and the fifth link axis are substantially aligned.

In some embodiments, the base support further comprises a pivoting base member rotationally coupled to the upper end of the base support and rotatable about a vertical base axis, and wherein the first end of the linkage assembly is coupled to the pivoting base member.

In some embodiments, the display support member further comprises a pivoting display member rotationally coupled to the bracket and rotatable about a vertical display axis, and wherein the second end of the linkage assembly is coupled to the pivoting display member.

In some embodiments, the display support member further comprises a tilting display member rotationally coupled to the bracket and rotatable about a horizontal display axis, and a wherein the second end of the linkage assembly is coupled to the tilting display member.

In some embodiments, the display support member further comprises a tilting display member rotationally coupled to the bracket and rotatable about a horizontal display axis, and a pivoting display member rotationally coupled to the tilting display member and rotatable about a vertical display axis, and wherein the second end of the linkage assembly is coupled to the pivoting display member.

In some embodiments, the apparatus further comprises a tension adjustment mechanism configured to selectively vary a tension of the spring.

In some embodiments, the tension adjustment mechanism comprises a cap screw at the first end of the spring, and wherein a drive end of the cap screw is accessible in the lower position.

In some embodiments, the tension adjustment mechanism comprises a worm gear assembly.

In some embodiments, the worm gear assembly comprises: a worm gear positioned at the second end of the linkage assembly and operably coupled to the second end of the spring; and a worm shaft drivingly engaged to the worm gear such that rotating a drive end of the worm shaft results in rotation of the worm gear, whereby the tension of the spring is varied, wherein the drive end of the worm shaft is accessible in both the lower position and the upper position.

In some embodiments, the worm shaft is disposed within the display support member.

In some embodiments, the worm shaft further comprises a first collar and a second collar positioned at opposite ends of the worm shaft, the first collar and the second collar being configured to inhibit the worm shaft from being displaced along a longitudinal axis of the worm shaft.

In some embodiments, the drive end of the worm shaft is configured to receive a hex head tool.

In some embodiments, the first link member comprises a pair of side walls each having upper and lower edges and a connecting web extending between the upper edges of the side walls, and wherein the second link member and the spring are positioned between the side walls.

In some embodiments, the second link member comprises a pair of second link members positioned on opposing sides of the spring.

In some embodiments, the apparatus further comprises a cord management clip removably positionable between the lower edges of the side walls.

In some embodiments, the apparatus further comprises a clamp coupled to the lower end of the base support for securing the apparatus to the furniture piece.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 12 is a section view of a dynamic arm link in accordance with an alternative embodiment;

FIG. 13 is a top view of the dynamic arm link of FIG. 12;

The drawings included herewith are for illustrating various examples of articles, methods, and apparatuses of the teaching of the present specification and are not intended to limit the scope of what is taught in any way.

DETAILED DESCRIPTION

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Figure 1:
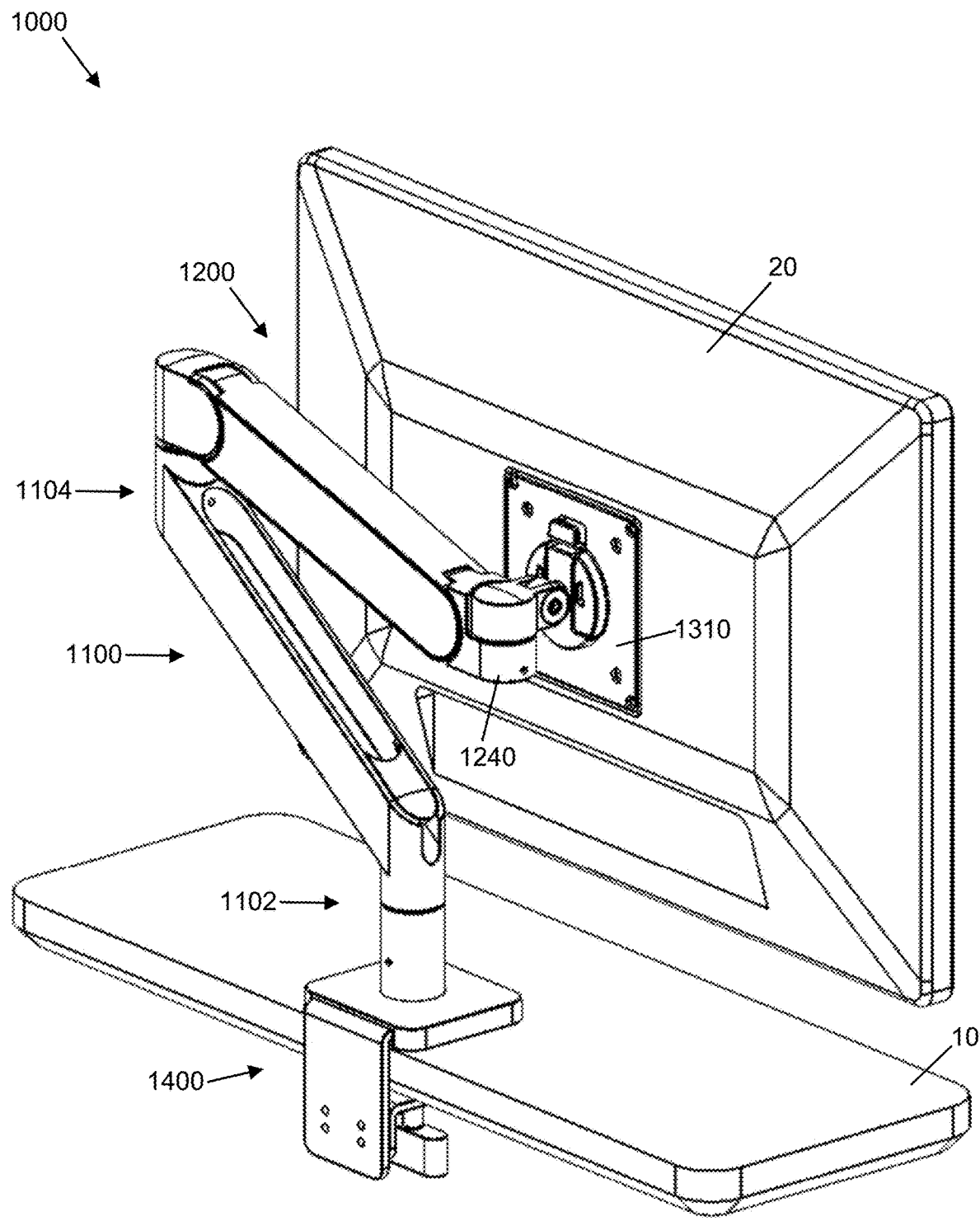
FIG. 1 is a perspective view of an exemplary counterbalancing support arm secured to a furniture piece and supporting a display.

FIG. 1 shows a counterbalancing support arm (which may also be referred to as a dynamic monitor arm), referred to generally as 1000, secured to a furniture piece 10 (in this case a worksurface of a desk) and supporting a display 20 (e.g. a liquid crystal display (LCD) monitor). Counterbalancing support arm 1000 may be used within an individual's office, in a shared workspace, or in a common area.

As discussed further below, counterbalancing support arm 1000 provides load balanced, vertical height adjustment of a supported display. Specifically, a spring mechanism is used to counterbalance the weight of a supported display, allowing a user to selectively reposition the height of the display between a lower position and an upper position. To accommodate displays of different weights, the spring force can be adjusted to correspond to the weight of a specific display being supported. The display can then be moved up or down to the desired position without the use of tools, and will remain at the selected vertical position.

Referring to FIG. 1, counterbalancing support arm 1000 includes a base support, referred to generally as 1100, a display support member having a bracket 1310 to which a display 20 may be secured, and a linkage assembly, referred to generally as 1200. The base support 1100 may be characterized as a static arm link of the counterbalancing support arm, and the linkage assembly 1200 may be characterized as a dynamic arm link of the counterbalancing support arm.

Figure 2:
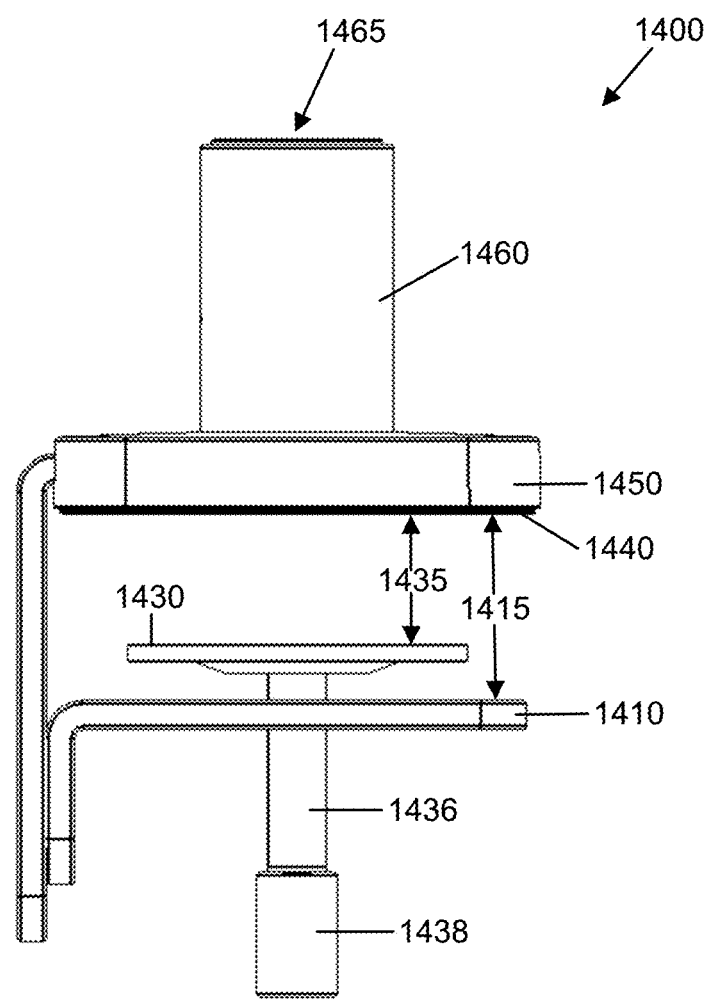
FIG. 2 is a side view of a clamp for securing the counterbalancing support arm of FIG. 1 to a furniture piece.

As illustrated in FIG. 2, a clamp 1400 may be used to secure a lower end 1102 of the base support 1100 to the worksurface 10. In the illustrated example, clamp 1400 has an upper flange 1450 and a lower flange 1410 that extend generally parallel to each other. A post 1460 extends upwardly from upper flange 1450. Lower flange 1410 and upper flange 1450 define a gap 1415 therebetween. A shaft 1436 disposed through a threaded bore in lower flange 1410 supports an adjustable flange 1430 in the gap 1415. Adjustable flange 1430 and upper flange 1420 define a gap 1435 therebetween.

Optionally, a surface treatment may be provided on the lower surface of upper flange 1450 and/or on adjustable flange 1430 to increase the friction between the clamp 1400 and the furniture piece 10, and/or to prevent damage to the furniture piece. In the illustrated example, a gripping insert 1440 is provided on the lower surface of upper flange 1450.

In use, gap 1435 is positioned about a portion of a furniture piece (e.g. an edge of a worksurface) and then shaft 1436 may be rotated (e.g. using hand grip 1438) to axially displace adjustable flange 1430 upwardly towards upper flange 1450, thereby reducing the height of gap 1435 until upper flange 1450 and adjustable flange 1430 are flush with an upper and lower surface of the portion of the furniture piece, thereby securing the clamp 1400 to the furniture piece.

In the illustrated example, post 1460 has an axial bore 1465 for receiving a lower end 1102 of the base support 1100. Optionally, a bushing may be provided in the axial bore 1465 of post 1460 to provide a predetermined amount of friction between the clamp 1400 and the base support 1100, thereby controlling the amount of force needed to rotate the base support.

It will be appreciated that the base support 1100 may be secured to a furniture piece using any other suitable coupling method, such as an alternative clamping arrangement.

Figure 3:
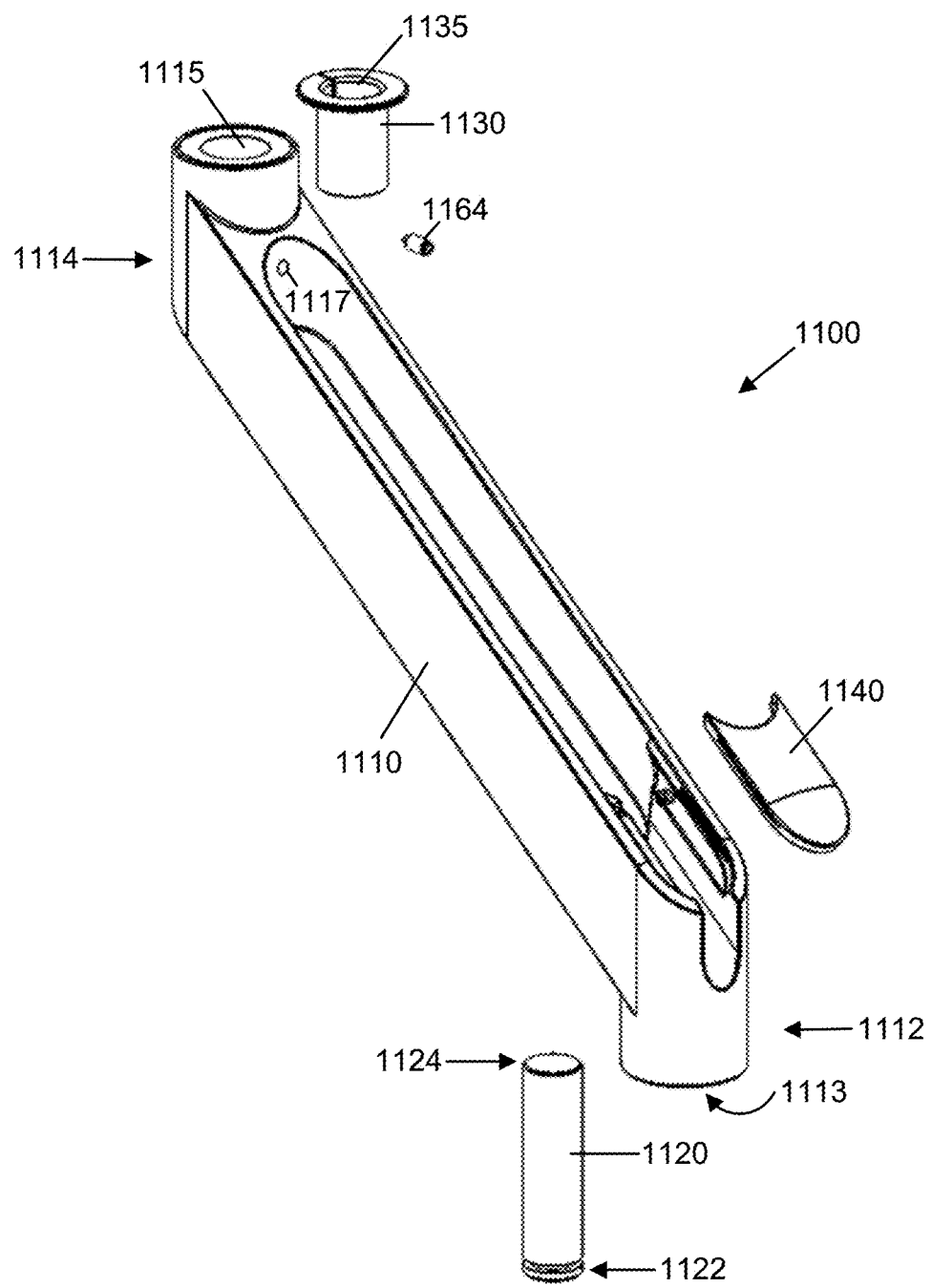
FIG. 3 is an exploded perspective view of a static arm link of the counterbalancing support arm of FIG. 1.

Referring to FIG. 3, in the illustrated example base support 1100 includes a static arm 1110 having a lower end 1112 that is coupled to clamp 1400, and an upper end 1114 that is coupled to linkage assembly 1200.

Preferably, static arm 1110 is pivotally coupled to clamp 1400, such that static arm 1110 can be rotated about a vertical axis. In the illustrated example, the lower end 1112 of static arm 1110 has a bore 1113 in which an upper end 1124 of a cylindrical member 1120 is received. A lower end 1122 of the cylindrical member 1120 is positioned in the axial bore 1465 of post 1460 (See FIG. 2). It will be appreciated that the static arm 1110 may be pivotally coupled to clamp 1400 using any other suitable coupling method, or it may be coupled to clamp 1400 in a fixed orientation.

Preferably, static arm 1110 is also pivotally coupled to linkage assembly 1200, such that the linkage assembly can be rotated relative to the upper end of static arm 1110 about a vertical axis. In the illustrated example, the upper end 1114 of static arm 1110 has a vertical bore 1115 in which a projection of linkage assembly 1200 is received. Optionally, a bushing 1130 having an axial bore 1135 may be provided in the bore 1115 of static arm 1110 to provide a predetermined amount of friction between the static arm 1110 and the linkage assembly 1200, thereby controlling the amount of force needed to rotate the linkage assembly 1200. In the illustrated example, bushing 1130 is secured in a fixed position relative to the bore 1115 of arm 1110 using a set screw 1164 positioned in a transverse bore 1117 of arm 1110. It will be appreciated that the static arm 1110 may be pivotally coupled to linkage assembly 1200 using any other suitable coupling method, or it may be coupled to linkage assembly 1200 in a fixed orientation.

Referring to FIGS. 4 to 8, in the illustrated example, linkage assembly 1200 has a first end 1202 that is coupled to an upper end 1104 of the base support 1100, and a second end 1204 that is coupled to a display support member 1240.

Preferably, the upper end 1104 of the base support 1100 includes a pivoting base member 1230 that is pivotally coupled to static arm 1110, such that the pivoting base member 1230 (and thus the linkage assembly 1200) can be rotated about a vertical axis with respect to the static arm 1110. In the illustrated example, the pivoting base member 1230 has a downward projection 1232 that is positioned in the vertical bore 1115 of static arm 1110, e.g. positioned in axial bore 1135 of bushing 1130 (see FIG. 3). It will be appreciated that the pivoting base member 1230 may be pivotally coupled to static arm 1110 using any other suitable coupling method, or it may be coupled to static arm 1110 in a fixed orientation.

As shown in FIGS. 4 to 8, linkage assembly 1200 includes a first arm 1210 and, in the illustrated example, a pair of second arms 1220*a*, 1220*b*. A first end 1212 of first arm 1210 is rotationally secured to pivoting base member 1230, and a second end 1214 of first arm 1210 is rotationally secured to display support member 1240. Similarly, a first end 1222*a*, 1222*b* of each second arm 1220*a*, 1220*b* is rotationally secured to pivoting base member 1230, and a second end 1224*a*, 1224*b* of each second arm 1220*a*, 1220*b* is rotationally secured to display support member 1240.

In the illustrated embodiment, the first end 1212 of first arm 1210 is coupled to pivoting base member 1230 by aligning a bore 1211 at the end of the first arm 1210 with a pair of bores 1231 in pivoting base member 1230 and positioning a shaft 1235 through the aligned bores. Similarly, the second end 1214 of first arm 1210 is coupled to display support member 1240 by aligning a pair of bores 1213 at the end of the first arm 1210 with a bore 1241 in display support member 1240 and positioning a shaft 1245 through the aligned bores. It will be appreciated that any suitable rotational coupling method may alternatively be used.

The first end 1222*a*, 1222*b* of each second arm 1220*a*, 1220*b* is coupled to pivoting base member 1230 by aligning a bore 1221*a*, 1221*b* at the end of each second arm 1220*a*, 1220*b* with a pair of bores 1233 in pivoting base member 1230 and positioning a shaft 1270 through the aligned bores. Similarly, the second end 1224*a*, 1224*b* of each second arm 1220*a*, 1220*b* is coupled to display support member 1240 by aligning a bore 1223*a*, 1223*b* at the end of each second arm 1220*a*, 1220*b* with a bore 1243 in display support member 1240 and positioning a shaft 1225 through the aligned bores. It will be appreciated that any suitable rotational coupling method may alternatively be used.

Optionally, one or more bearings or bushings 1274 may be provided between bores 1233 and shaft 1270, and/or between bores 1223, bore 1243, and/or shaft 1225 to control the amount of force needed to rotate the linkage assembly 1200 between the upper position and the lower position. In the illustrated example, shaft 1270 includes optional shaft tips 1276*a*, 1276*b* positioned at opposite ends of shaft 1270 (see FIG. 5). The shaft tips 1276*a*, 1276*b* are sized to engage the interior of bearings or bushings 1274.

When arms 1210, 1220 are rotationally secured to the pivoting base member 1230 and to the display support member 1240, the arms and members may be characterized as a four-bar linkage. It will be appreciated that the lengths of the arms 1210, 1220 and/or the spacing of their mounting points on the end members may be selected based on dimensions of the display to be supported (e.g. the length, width, and mass of the display, etc.), and/or to provide a desired travel path for the display.

Figure 9:
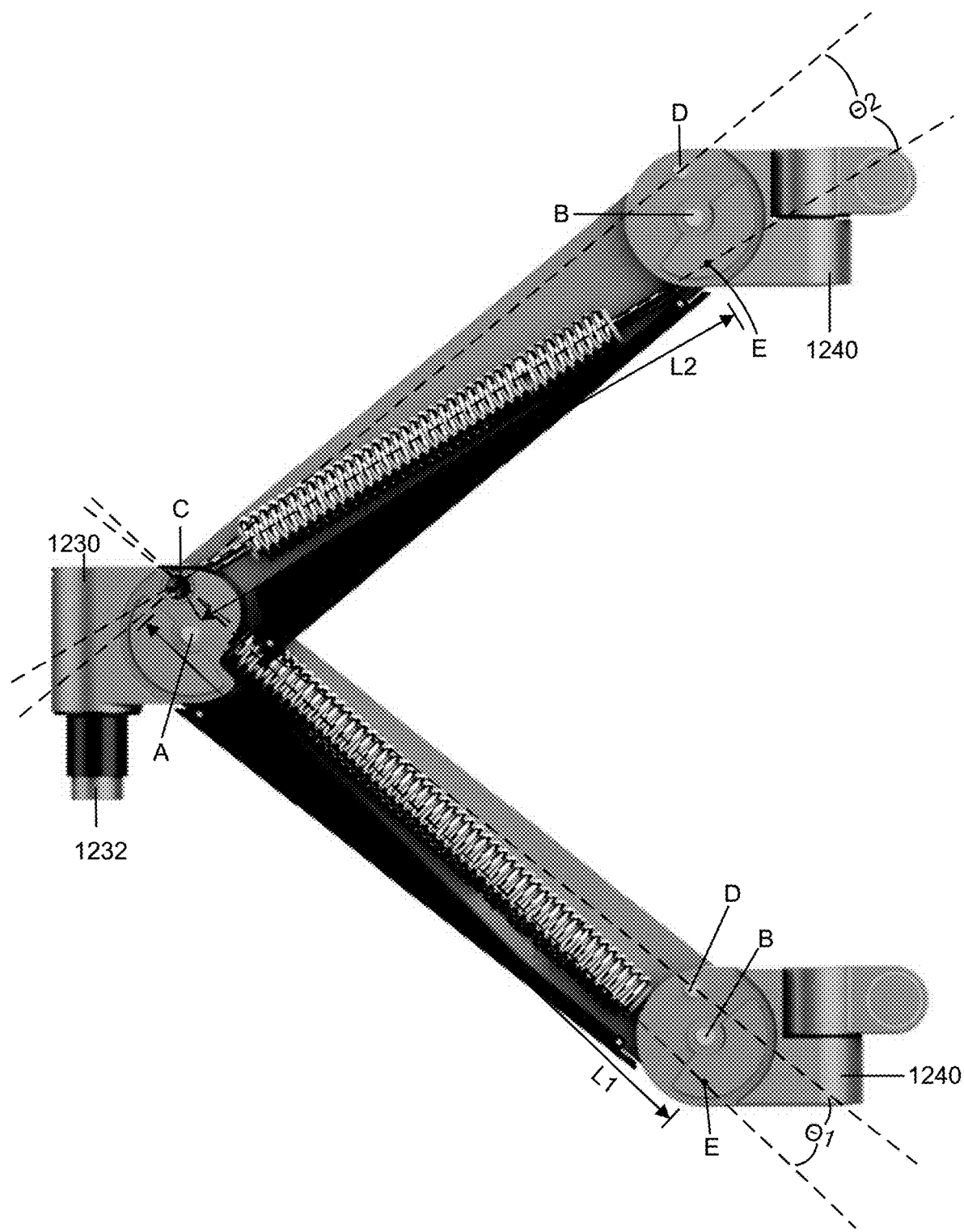
FIG. 9 is a superimposed side view of the dynamic arm link of FIG. 4 in an upper position and a lower position.

The pivot axes at the ends 1212, 1214 of the first arm 1210 (i.e. the central axis of shafts 1235 and 1245) may be characterized as the first and second horizontal link axis, respectively, of the linkage assembly 1200. Similarly, the pivot axes at the ends 1222*a*, 1222*b*, and 1224*a*, 1224*b* of the second arms 1220*a*, 1220*b* (i.e. the central axis of shafts 1270 and 1225) may be characterized as the third and fourth horizontal link axis, respectively, of the linkage assembly 1200. In FIG. 9, the first horizontal link axis is labelled as axis A, the second horizontal link axis is labelled as axis B, the third horizontal link axis is labelled as axis C, and the fourth horizontal link axis is labelled as axis D.

Figure 4:
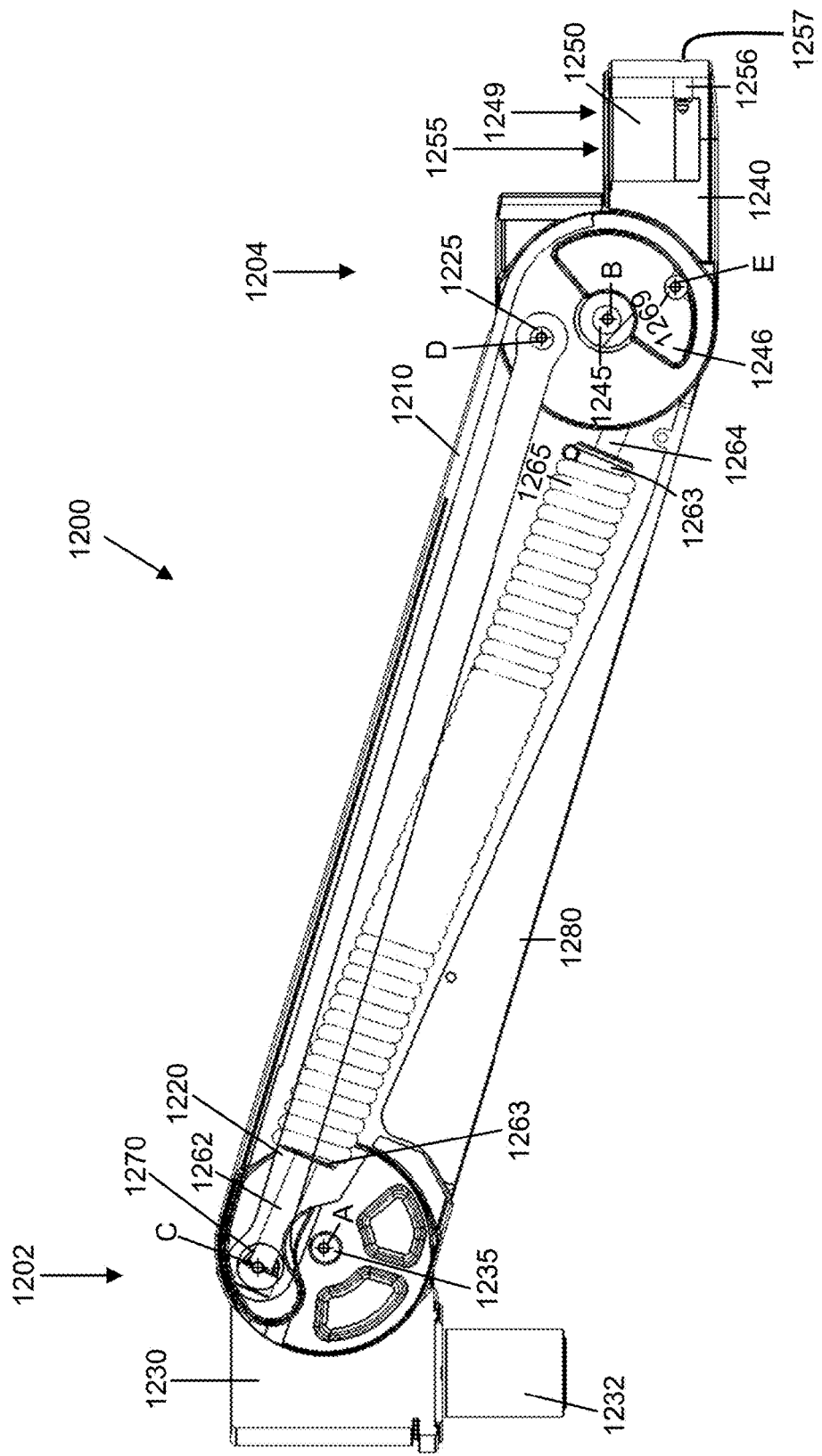
FIG. 4 is a section view of a dynamic arm link of the counterbalancing support arm of FIG. 1, with a second link member shown as transparent.

Notably, as shown in FIG. 4, the third horizontal link axis C is positioned above the first horizontal link axis A, and is laterally offset from the first horizontal link axis A towards the first end 1202 of the linkage assembly 1200. Also, the fourth horizontal link axis D is positioned above the second horizontal link axis B, and is laterally offset from the second horizontal link axis B towards the first end 1202 of the linkage assembly 1200.

Figure 6:
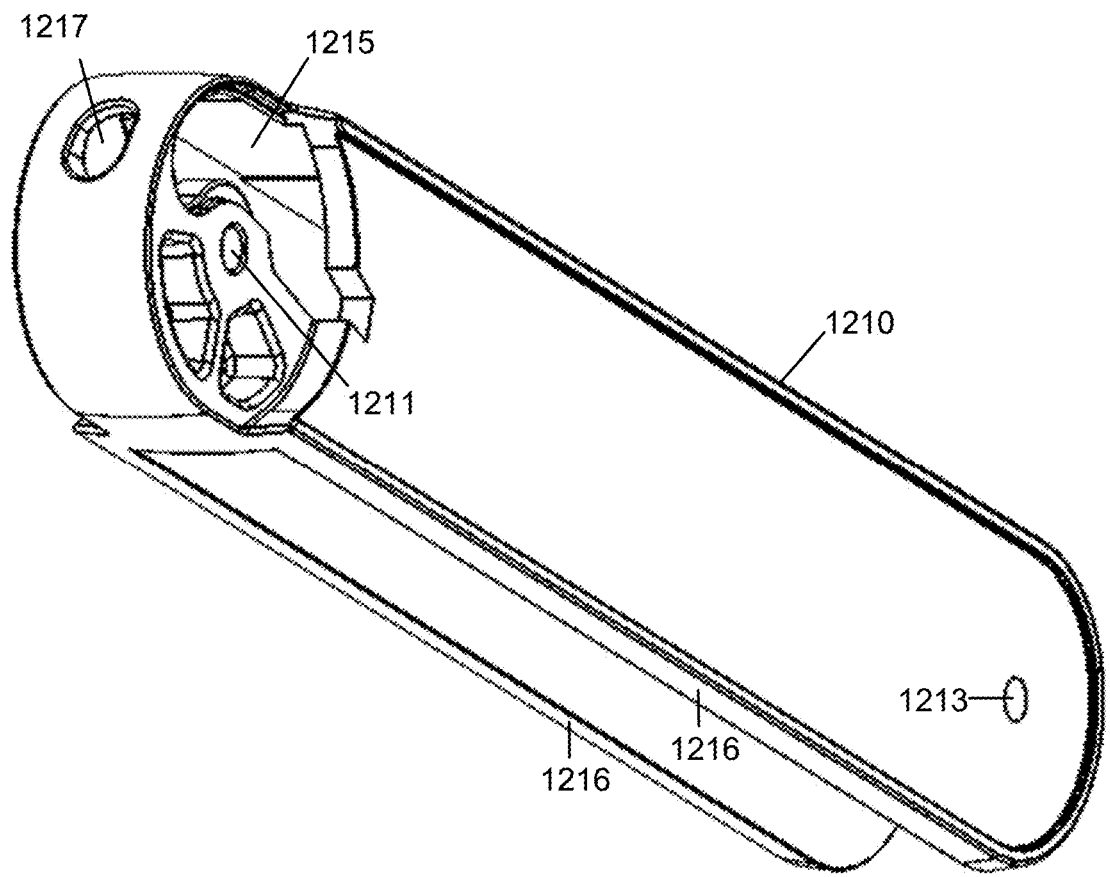
FIG. 6 is a perspective view of a first link member of the dynamic arm link of FIG. 4.
Figure 7:
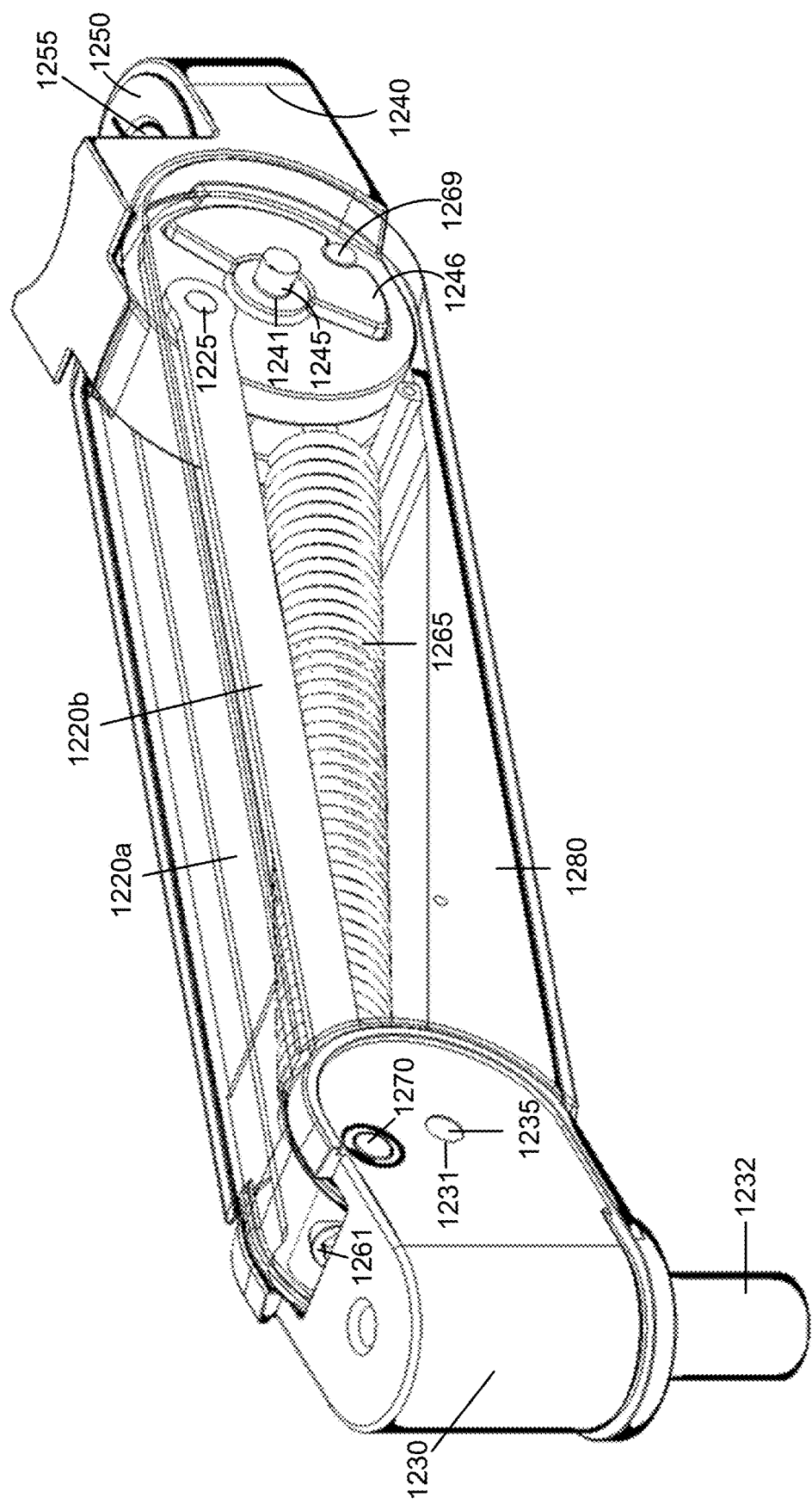
FIG. 7 is a perspective view of the dynamic arm link of FIG. 6, with a first link member shown as transparent.
Figure 8:
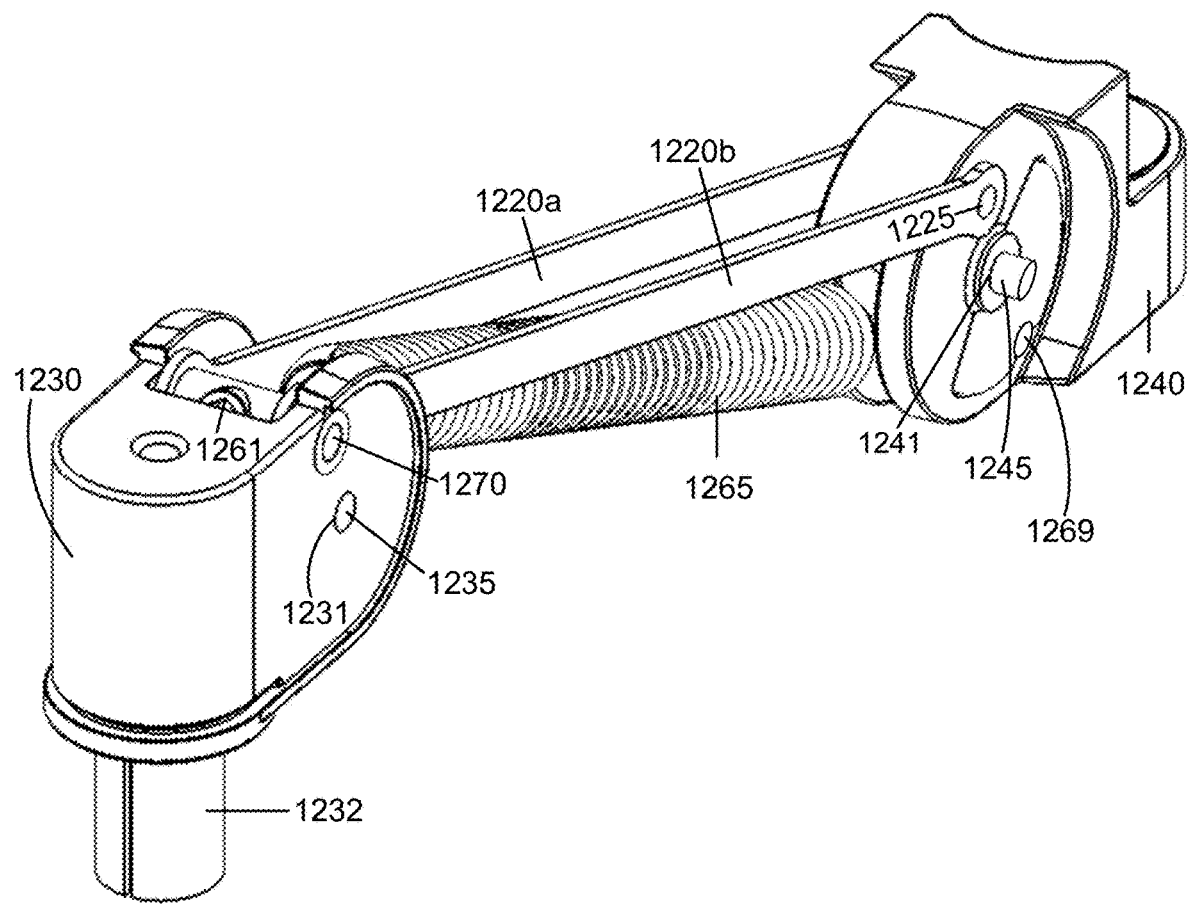
FIG. 8 is a perspective view of the dynamic arm link of FIG. 4, with a first link member and a cord management clip removed for ease of illustration.

Referring primarily to FIG. 6, in the illustrated example, first link member 1210 has a pair of side walls 1216 connected along their upper edges by a connecting web 1215. Side walls 1216 and web 1215 cooperatively define a volume in which the second arms 1220a, 1220b and a biasing member are received. Such a configuration may provide a desired aesthetic appearance, although it will be appreciated that other configurations of first link member 1210 may alternatively be used.

Optionally, a cord management clip 1280 (see e.g. FIG. 5) may be provided between the pair of side walls 1216 to assist in maintaining one or more cables associated with the display 20 in the volume defined by side walls 1216 and web 1215, or to otherwise provide a desired aesthetic appearance. Also, as shown in FIG. 5, one or more optional cover plates 1201 may be provided to provide a desired aesthetic appearance.

Linkage assembly 1200 also includes a biasing member for imparting an upward force to the display support member 1240, to counterbalance the weight of the display 20. In the illustrated embodiment, biasing member comprises a coil spring or tension spring 1265 that is biased towards a contracted state.

Figure 5:
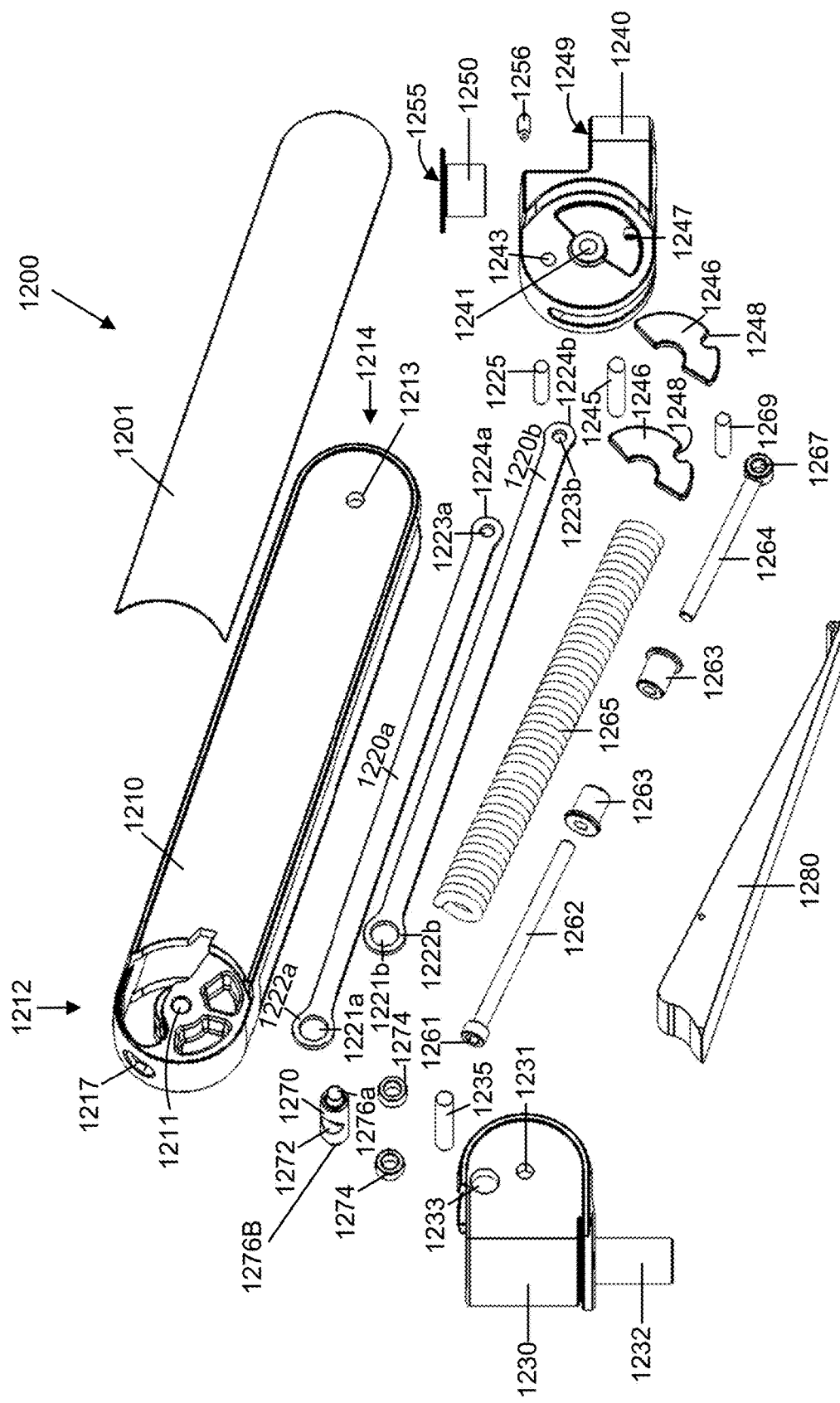
FIG. 5 is an exploded view of the dynamic arm link of FIG. 4.

Continuing to refer to FIG. 5, in the illustrated example, the biasing member includes a first rod 1262 and a second rod 1264, with each rod being coupled to opposite ends of spring 1265 via a spring engaging member 1263. An end 1261 of first rod 1262 is received in a transverse bore 1272 of shaft 1270, such that a first end of the spring is rotationally coupled to the pivoting base member 1230 about the same axis of rotation as the first ends 1222a, 1222b of each second arm 1220a, 1220b (i.e. third horizontal link axis C). As the first end of spring 1265 is connected to shaft 1270 via rod 1262, the spring may be characterized as being indirectly coupled to the upper end of the base support. It will be appreciated that any suitable rotational coupling method may alternatively be used.

A second end of the biasing member is rotationally coupled to the display support member 1240 about an axis of rotation (i.e. fifth horizontal link axis E) that is positioned below the second link axis B and laterally offset from the second link axis B towards the second end 1204 of the linkage assembly 1200.

Optionally, as in the illustrated example, the second horizontal link axis B, the fourth horizontal link axis D, and the fifth horizontal link axis E may be substantially aligned, in that a line between the fourth horizontal link axis D and the fifth horizontal link axis E intersects, or almost intersects, the second horizontal link axis B. Put another way, the second horizontal link axis B, the fourth horizontal link axis D, and the fifth horizontal link axis E may optionally be substantially coplanar.

In the illustrated example, the second rod 1264 is coupled to display support member 1240 by aligning a bore 1267 at the end of the second rod 1264 with a pair of bores 1247 in display support member 1240 and positioning a shaft 1269 through the aligned bores. As the second end of spring 1265 is connected to shaft 1269 via rod 1264, the spring may be characterized as being indirectly coupled to the display support member. It will be appreciated that any suitable rotational coupling method may alternatively be used.

Notably, as seen in FIGS. 4 and 9, the mounting location of the end 1267 of the rod 1264 on display support member 1240 (i.e. axis E) is below the mounting locations of the second ends 1214, 1224 of arms 1210, 1220, and is also laterally offset from the second link axis B towards the second end 1214 of the first link member 1210. As noted above, spring 1265 is biased towards a contracted state. Accordingly, in the illustrated configuration, if the end 1261 of first rod 1262 is taken as being fixed at the second horizontal link axis C, spring 1265 exerts a force on the display support member 1240 at the axis of rotation E, in a direction along the longitudinal axis of the spring. This spring force imparts a moment on display support member 1240, which, due to the four bar linkage or parallelogram between axes A, B, C, and D, results in an upwards or vertical force component that urges the display support member 1240 upwardly.

The magnitude of the vertical force component urging the display support member 1240 upwardly is dependent on: i) the relative angle between the longitudinal axis of the spring and the longitudinal axes of the link members 1210, 1220 (i.e. the angle between a first line through axes C and D, and a second line through axes C and E); and ii) the magnitude of the force applied by the spring, which is in turn dependent on the length of the spring (i.e. the distance between axes C and E).

With reference to FIG. 9, in the illustrated configuration, when in the lower position (with the display support member below the upper end of the base support), the biasing member (including spring 1265) and the link members are at an angle $\theta_1$, and the first and second ends of the biasing member (i.e. axes C and E) are separated by a first distance $L_1$. Also, when the in the upper position (with the display support member above the upper end of the base support), the biasing member and the link members are at an angle $\theta_2$ that is greater than $\theta_1$, and the first and second ends of the biasing member (i.e. axes C and E) are separated by a second distance $L_2$ that is less than $L_1$.

As the angle between the biasing member and the link members increases, a greater portion of the spring force acts as a vertical component, urging the display support member 1240 upwardly. Put another way, the greater the angle between the biasing member and the link members, the more 'efficient' the linkage assembly is at transferring the spring force into a vertical force component at the display support member 1240. Thus, in the upper position, a greater percentage of the spring force is transferred to a vertical force component, and in the lower position, a lesser percentage of the spring force is transferred to a vertical force component.

Also, as the distance between the biasing member and the link members increases, the force exerted by the spring 1265 increases (according to Hooke's law). Put another way, the greater the distance between the ends of the biasing member (i.e. the greater the distance between the ends of the spring), the greater the spring force available to be transferred into a vertical force component at the display support member 1240. Thus, in the upper position, a lower spring force is available to be transferred to a vertical force component, and in the lower position, a higher spring force is available to be transferred to a vertical force component.

As a result, in the illustrated configuration, the magnitude of the vertical force component urging the display support member 1240 upwardly may be generally constant over the entire range of vertical positions of the display support member 1240, e.g. over the entire swept angle of the linkage assembly 1200. Accordingly, where the magnitude of the vertical force component urging the display support member 1240 upwardly is approximately equal (e.g. accounting for frictional losses) to a weight of a supported display, the linkage assembly 1200 may effectively counterbalance the display at any position over the entire swept angle of the linkage assembly 1200.

An advantage of the illustrated configuration (in which the third and fourth horizontal link axes C and D are laterally offset from, respectively, the first and second horizontal link axes A and B towards the first end 1212 of the linkage assembly 1200) is that the display support member 1240 can travel through a range of positions above and below the height of pivoting base member 1230. For example, display support member 1240 may be have a total swept angle of +/−38° relative to the horizontal level of pivoting base member 1230.

Optionally, a pair of friction plates 1246 may be provided between the display support member 1240 and the first arm 1210 to provide a predetermined amount of friction between the display support member 1240 and the linkage assembly 1200, thereby controlling the amount of force needed to rotate the display support member 1240 relative to the linkage assembly 1200. Friction provided by friction plates 1246 may provide a 'margin of error', allowing the display 20 to remain at a desired vertical position as long as the difference between the upward force imposed on the display support member 1240 by the spring 1265 and the downward force of the weight of the supported display is less than a resistance provided by friction plates 1246. In the illustrated example, each friction plate 1246 includes a notch or recess 1248 to accommodate shaft 1269.

Preferably, a tension adjustment mechanism is provided to selectively vary a tension of the spring. An advantage of providing a tension adjustment member is that the linkage assembly 1200 may be adjusted to vary the magnitude of the upward force imposed on the display support member 1240 by the spring 1265, thereby allowing the apparatus to support monitors of different weights.

Figure 11:
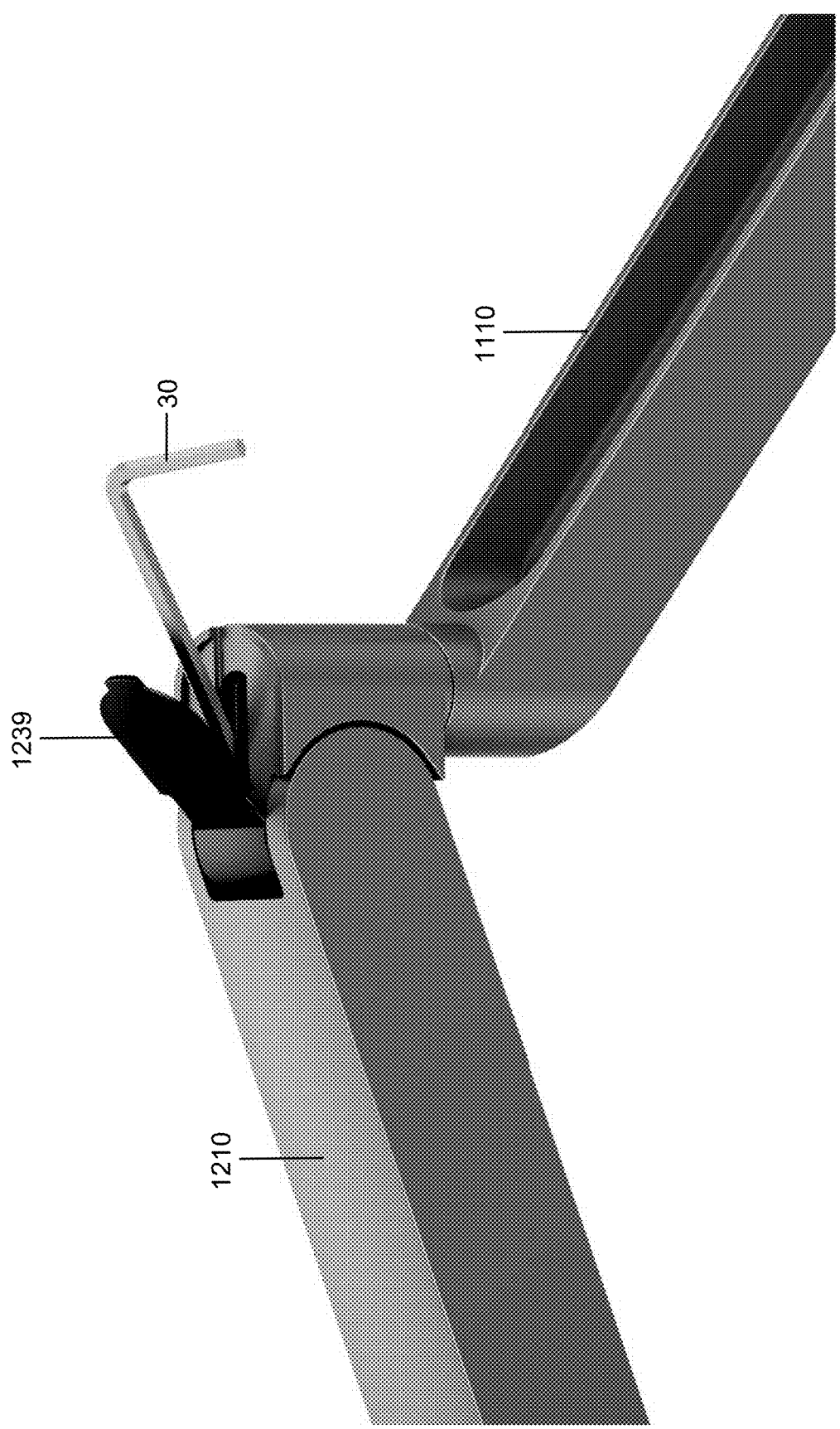
FIG. 11 is a perspective view of an upper end of the base support and an end of the dynamic arm link of the counterbalancing support arm of FIG. 1, showing a tension adjustment member being adjusted using a tool.

Referring to FIGS. 5 to 7 and 11, in the illustrated embodiment the first rod 1262 is a cap screw, with drive end 1261 configured to receive a hex head tool (e.g. a hex key 30 as shown in FIG. 11). The drive end 1261 of first rod 1262 is accessible through an aperture 1217 provided in the first end 1212 of first link member 1210 when the display support member 1240 is in a lower position. A portion of first rod is threaded, and spring engaging member 1263 is provided with corresponding internal threads, such that rotation of the first rod 1262 relative to spring engaging member 1263 results in a change in the distance between drive end 1261 and spring engaging member 1263, thereby varying the extension, and thus the tension, of spring 1265. An optional cover plate 1239 is provided in the illustrated example to cover aperture 1217.

Figure 10:
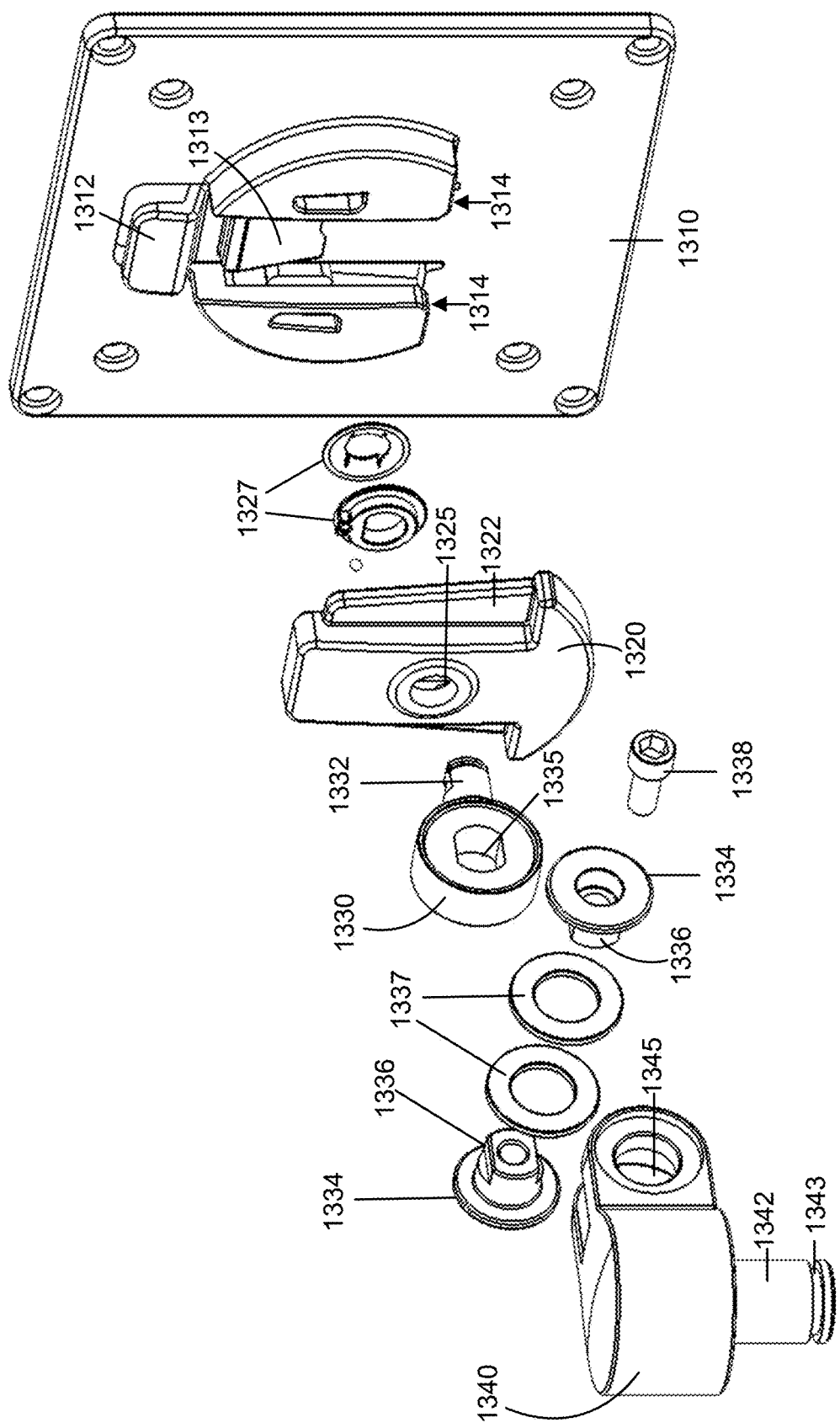
FIG. 10 is an exploded view of a display support member of the counterbalancing support arm of FIG. 1.

Referring to FIG. 10, bracket 1310 is provided to assist in securing a display 20 to the counterbalancing support arm 1000. For example, bracket 1310 may be adapted to be secured to a rear panel of a display 20 in accordance with one or more display mounting standards, such as a VESA standard.

In the illustrated embodiment, bracket 1310 is coupled to display support member 1240 via a swiveling display member, a tilting display member, and a pivoting display member, which allow the orientation of the display 20 to be adjusted relative to display support member 1240 without the use of tools.

As illustrated, bracket 1310 is a unitary component that has a pair of 'female' wedge slots 1314 configured to receive a 'male' wedge 1322 provided on swiveling display member 1320. A detent member 1313 is provided between the slots 1314 for engaging a corresponding indent (not shown) on swiveling display member 1320 to retain the male and female wedge members in an engaged position. An end 1312 of a lever arm on which the detent member 1313 is provided can be depressed to disengage the detent member 1313 from the swiveling display member 1320. An advantage of this arrangement is that once bracket 1310 is secured to display 20, the display can be attached to or removed without the use of tools.

In the illustrated example, swiveling display member 1320 has a bore 1325 into which a projection 1332 of tilting display member 1330 is disposed. Preferably, one or more rotation limiting stop members 1327 are also provided to limit the rotation of swiveling display member 1320 about projection 1332 to about 90 degrees (e.g. to allow display 20 to be swiveled from a 'portrait' orientation to a 'landscape' orientation).

Tilting display member 1330 is in turn coupled to a pivoting display member 1340 by aligning a bore 1335 of tilting display member 1330 with a pair of bores 1345 of pivoting display member 1340 and positioning a pair of shaft members 1336 through the aligned bores and securing the shaft members 1336 to each using a set screw 1338. In such a configuration, display 20 can be tilted with respect to pivoting display member 1340. Optionally, one or more bearings or bushings 1337 may be provided to between flanges 1334 of shaft members 1336 and pivoting display member 1340, to provide a predetermined amount of friction between the tilting display member 1330 and the pivoting display member 1340.

The pivoting display member 1340 is pivotally coupled to the display support member 1240, such that the pivoting display member 1340 (and thus the display 20) can be rotated about a vertical axis with respect to the display support member 1240. In the illustrated example, the pivoting display member 1340 has a downward projection 1342 that is positioned in a vertical bore 1249 of display support member 1240, e.g. positioned in an axial bore 1255 of a bushing 1250 (see FIG. 5). It will be appreciated that the pivoting display member 1340 may be pivotally coupled to display support member 1240 using any other suitable coupling method, or it may be coupled to display support member 1240 in a fixed orientation.

In the illustrated example, the display support member 1240 includes a transverse aperture 1257 that passes into the axial bore 1249 of the display support member. When the downward projection 1342 of the pivoting display member 1340 is positioned in the axial bore 1255 of bushing 1250, a set screw 1256 may be inserted through the transverse aperture 1257 and extend into an annular recess 1343 formed on the downward projection 1342 (see FIG. 10). When the set screw 1256 engages the annular recess 1343, pivoting display member 1340 may be inhibited or prevented from being removed from display support member 1240. It will be appreciated that the pivoting display member 1340 may be pivotally secured to display support member 1240 using any other suitable coupling method, or it may be coupled to linkage assembly 1200 in a fixed orientation.

In the illustrated example, bushing 1130 is secured in a fixed position relative to the bore 1115 of arm 1110 using a set screw 1164 positioned in a transverse bore 1117 of arm 1110. It will be appreciated that the static arm 1110 may be pivotally coupled to linkage assembly 1200 using any other suitable coupling method, or it may be coupled to linkage assembly 1200 in a fixed orientation.

FIGS. 12-16 illustrate an example linkage assembly in accordance with an alternative embodiment. Elements having similar structure and/or performing similar function as those in the example linkage assembly illustrated in FIGS. 4 to 9 and 11 are numbered similarly, with the reference numerals incremented by 1000.

Figure 15:
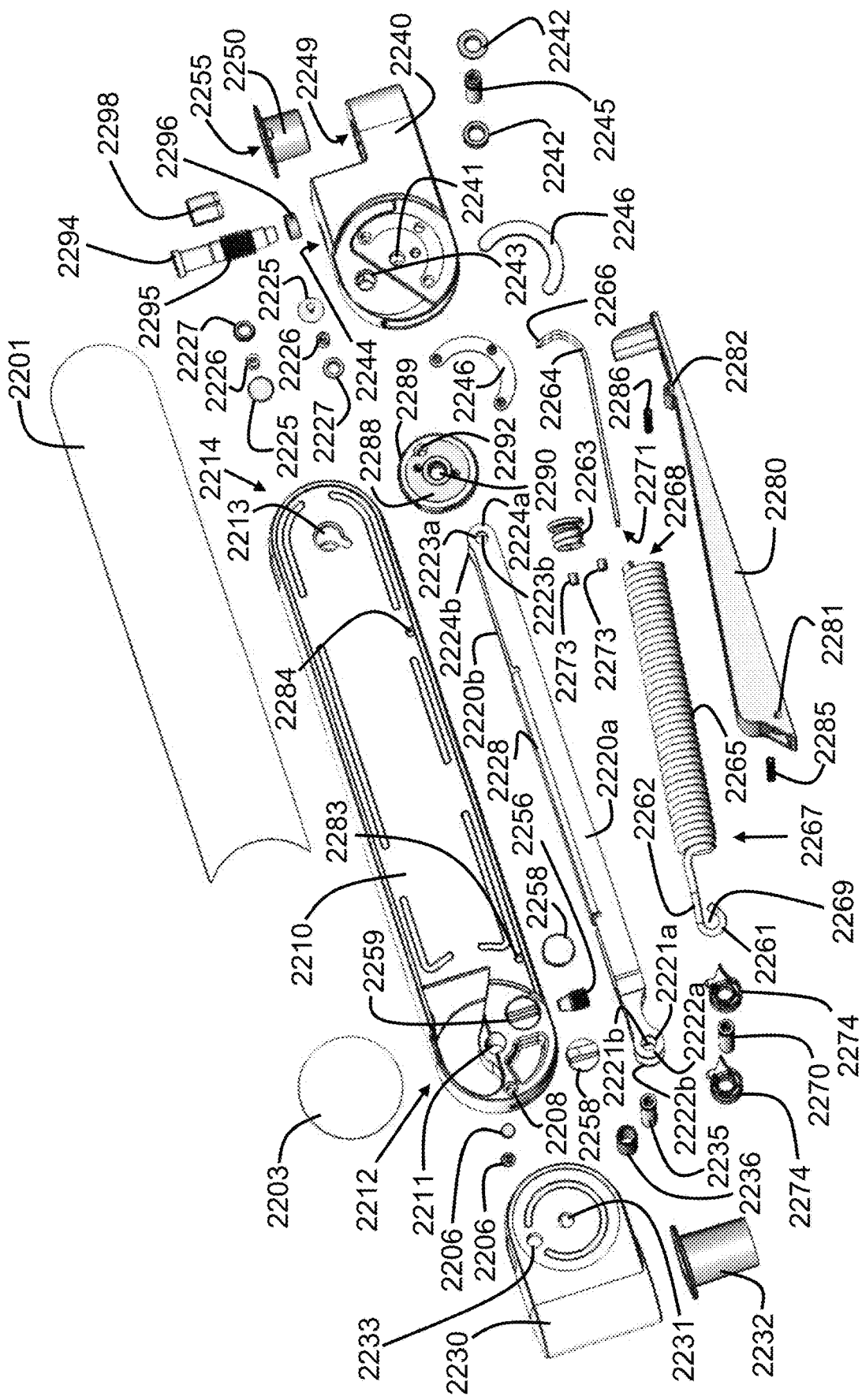
FIG. 15 is an exploded view of the dynamic arm link of FIG. 12.

FIG. 15 shows an exploded view of the linkage assembly 2200 of FIG. 12. Linkage assembly 2200 includes a first arm 2210 and a pair of second arms 2220a, 2220b. In the illustrated example, the pair of second arms 2220a, 2220b are attached to one another along their upper edges by a bridge connection 2228, although this need not be the case.

A first end 2212 of first arm 2210 may be coupled to a pivoting base member 2230 by aligning a bore 2211 at the first end 2212 of the first arm 2210 with a pair of bores 2231 in pivoting base member 2230 and positioning a shaft 2235 through the aligned bores. Optionally, a bushing 2236 may be aligned in bore 2211 to provide a predetermined amount of friction between the first arm 2210 and the pivoting base member 2230 to control the amount of force needed to rotate the linkage assembly 2200 relative to the pivoting base member 2230. Similarly, a second end 2214 of first arm 2210 may be coupled to display support member 2240 by aligning a pair of bores 2213 at the second end 2214 of the first arm 2210 with a pair of bores 2241 in display support member 2240 and positioning a shaft 2245 through the aligned bores. Optionally, one or more bushings 2242 may be aligned on shaft 2245 between the pair of bores 2213 and the pair of bores 2241 to control the amount of force needed to rotate the display support arm 2240 relative to the linkage assembly 2200.

A first end 2222a, 2222b of each second arm 2220a, 2220b may be coupled to pivoting base member 2230 by aligning a bore 2221a, 2221b at the end of each second arm 2220a, 2220b with a pair of bores 2233 in pivoting base member 2230 and positioning a shaft 2270 through the aligned bores. Similarly, a second end 2224a, 2224b of each second arm 2220a, 2220b may be coupled to display support member 2240 by aligning a bore 2223a, 2223b at the end of each second arm 2220a, 2220b with a pair of bores 2243 in display support member 2240 and positioning a pair of flanges 2225 through the aligned bores. Each flange 2225 may be secured by a cap 2226 to prevent the bores 2223a, 2223b of each second arm 2220, 2220b from uncoupling with the pair of bores 2243. Optionally, the caps 2226 may be threaded. Optionally, one or more bushings 2227 may be provided on each flange 2225 between the bores 2223a, 2223b and their corresponding bore 2243 to provide a predetermined amount of friction between the second arms 2220a, 2220b and the display support member 2240, thereby controlling the amount of force needed to rotate the display support arm 2240 relative to the linkage assembly 2200. It will be appreciated that any suitable rotational coupling method may alternatively be used.

When the first arm 2210 and the second arms 2220a, 2220b are rotationally secured to the pivoting base member 2230 and to the display support member 2240, the arms and members may be characterized as a four-bar linkage. In FIG. 12, the first horizontal link axis is labelled as axis A, the second horizontal link axis is labelled as axis B, the third horizontal link axis is labelled as axis C, and the fourth horizontal link axis is labelled as axis D.

Notably, as shown in FIG. 12, the third horizontal link axis C is positioned above the first horizontal link axis A, and is laterally offset from the first horizontal link axis A towards the first end 2202 of the linkage assembly 2200. Also, the fourth horizontal link axis D is positioned above the second horizontal link axis B, and is laterally offset from the second horizontal link axis B towards the first end 2202 of the linkage assembly 2200.

Figure 16:
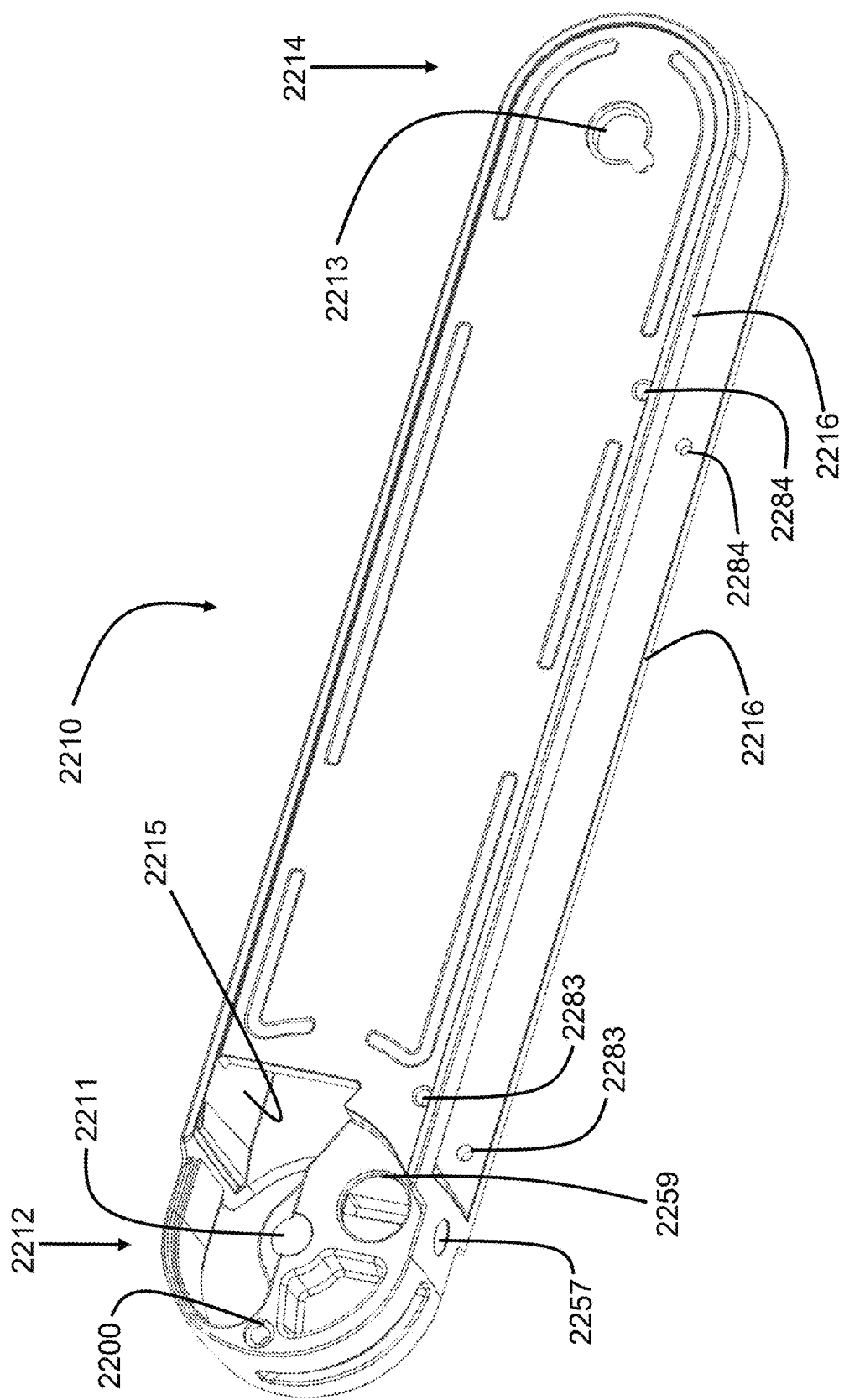
FIG. 16 is a perspective view of a first link member of the dynamic arm link of FIG. 12.

FIG. 16 shows a perspective view of the first arm 2210 of the linkage assembly 2200. As shown, the first arm 2210 has a pair of side walls 2216 connected along their upper edges by a connecting web 2215. Side walls 2216 and web 2215 cooperatively define a volume in which the second arms 2220a, 2220b and a biasing member are received. Such a configuration may provide a desired aesthetic appearance, although it will be appreciated that other configurations of the first arm 2210 may alternatively be used. Optionally, a cord management clip 2280 (see e.g. FIG. 15) may be provided. Referring to FIG. 15, the cord management clip 2280 may be attached to the first arm 2010 by aligning a bore 2281, 2282 in the cord management clip 2280 with a respective bore 2283, 2284 in the side walls 2216, and positioning a shaft 2285, 2286 through the aligned bores.

Optionally, as shown in FIG. 15, the linkage assembly 2200 may include cover plates 2201, 2203 to provide linkage assembly 2200 with a desired aesthetic appearance. In the illustrated example, when assembled, cover plate 2201 covers an exterior portion of the first arm 2210 and cover plate 2203 covers an exterior portion of the pivoting base member 2230.

Linkage assembly 2200 includes a biasing member for imparting an upward force to the display support member 2240 to counterbalance the weight of the display 20. In the illustrated embodiment, biasing member comprises a coil spring or tension spring 2265 that is biased towards a contracted state, and a tension adjustment mechanism is provided to selectively vary a tension of the spring.

Referring again still to FIG. 15, in the illustrated example, the tension spring 2265 includes an extension stem 2262 extending from a first end 2267 of tension spring 2265. An end 2261 of the of the extension stem 2262 is curled to form an aperture 2269 through which shaft 2270 can pass. In this way, the first end 2267 of the tension spring 2265 is coupled to the pivoting base member 2230 about the same axis of rotation as the first ends 1222a, 1222b of each second arm 1220a, 1220b (i.e. third horizontal link axis C, see FIG. 12). It will be appreciated that any suitable rotational coupling method may alternatively be used.

In the illustrated example, a pair of spacers 2274 are provided along the shaft 2270, with one spacer 2274 positioned on each side of the end 2261. Each spacer 2274 is configured with a transverse slot (not shown) formed therein that permits the first end 2222a, 2222b of each second arm 2220a, 2220b, when aligned with shaft 2270, to split the spacers into two portions. Accordingly, spacers 2274 can inhibit or prevent the first end 2222a, 2222b of each second arm 2220a, 2220b and the end 2261 of the extension stem 2262 from sliding along the shaft 2270 by filling the gaps along the shaft 2270 between the end 2261 and the first end 2222a, 2222b of each second arm 2220a, 2220b and between the first end 2222a, 2222b of each second arm 2220a, 2220b and the pivoting base member 2230.

Referring still to FIG. 15, a second end 2268 of the tension spring 2265 is coupled to a length of flexible cable 2264 via a spring engaging member 2263. In the illustrated example, cable 2264 is bent at a midpoint 2266. Each end 2271 of the cable 2264 is secured to the spring engaging member 2263 by passing the end through a respective bore (not shown) in the spring engaging member 2263 and capped by a fitting 2273 that prevents each end 2271 from exiting their respective bore.

The spring engaging member 2263 is coupled to the second end 2268 of the tension spring 2265. In the illustrated example, the spring engaging member 2263 is threaded such that it may be inserted into the second end 2268 of the tension spring 2265. (In FIG. 12, for the purposes of illustration, the spring engaging member 2263 is shown uncoupled from the tension spring 2265). It will be appreciated that any suitable coupling method may alternatively be used to couple the cable 2264 to the second end 2268 of the tension spring 2265.

Figure 14:
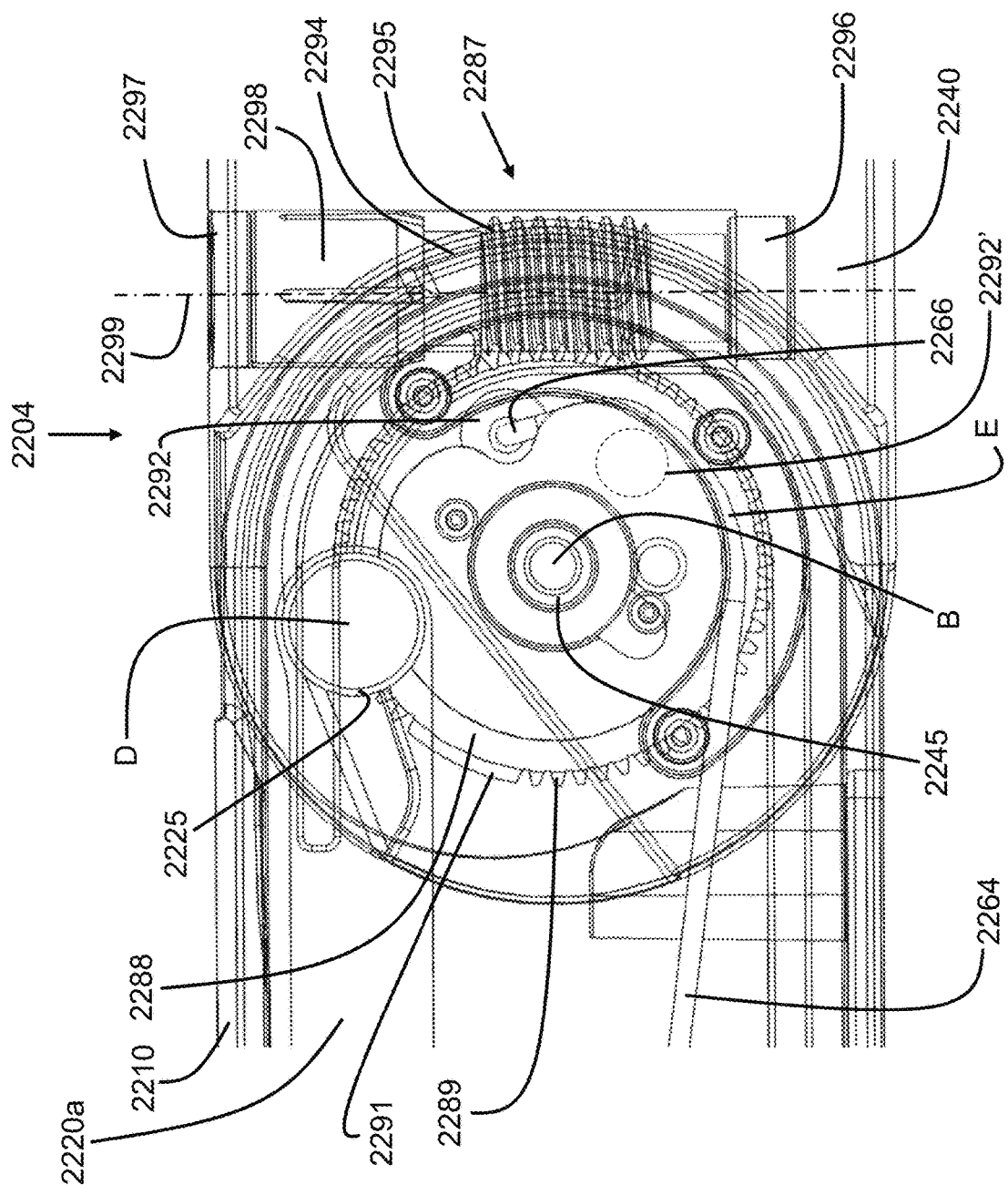
FIG. 14 is an enlarged view of a portion of the dynamic arm link of FIG. 12.

As shown in FIG. 14, a worm gear assembly 2287 including a worm gear 2288 and a worm shaft 2294 is positioned at the second end 2204 of linkage assembly 2200. The worm gear 2287 assembly is configured to selectively vary the tension of the tension spring 2265, e.g. in order to support displays of different weights. The worm gear 2288 includes a plurality of teeth 2289 positioned around its perimeter, and a central aperture 2290 (see FIG. 15). In the illustrated example, shaft 2245 can pass through the central aperture 2290 of worm gear 2288. In this way, the worm gear 2288 is rotationally coupled to the display support member 2240 about the same axis of rotation as the second end 2214 of the first arm 2010 (i.e. second horizontal link axis B). It will be appreciated that any suitable rotational coupling method may alternatively be used to secure the worm gear 2288 such that it may be rotated about the second horizontal link axis B.

The second end 2268 of tension spring 2265 is coupled to the worm gear 2288 via the cable 2292. In the example illustrated in FIG. 14, the worm gear 2288 further includes a cable receiving aperture 2292 offset from the central aperture 2290 of the worm gear 2288. The cable 2264 is positioned in the cable receiving aperture 2292 of the worm gear 2288, with approximately the midpoint 2266 being positioned in the cable receiving aperture 2292.

Referring still to FIG. 14, the worm shaft 2294 has a longitudinal axis 2299 and a threaded portion 2295 extending axially along the shaft 2294. The worm shaft 2294 is positioned relative to the worm gear 2288 such that the threaded portion 2295 is drivingly engaged with the plurality of teeth 2289 of the worm gear 2288. In the illustrated example, worm shaft 2294 is positioned in a worm shaft bore 2244 (see FIG. 15) of the display support member 2240. In the illustrated example, the worm shaft bore 2244 extends through the top of the display support member 2240.

Referring to FIG. 13, a drive end 2297 of the worm shaft 2294 is optionally configured to receive a hex head tool (e.g. a hex or Allen-type key). Although the illustrated example shows the drive end 2297 configured to revive the hex head tool, it will be appreciated that many other configurations are possible. The drive end 2297 of the worm shaft 2294 is accessible through the worm shaft bore 2244 of the display support member 2240. Notably, the drive end 2297 of the worm shaft 2294 is accessible when the linkage assembly 1200 is in both the upper position and the lower position. An advantage of this design is that the spring tension can be adjusted regardless of the position of the linkage assembly 2200.

Referring again to FIG. 14, the worm shaft 2294 is rotatable by rotating drive end 2297, e.g. using a hex head tool or the like. In the illustrated example, worm gear assembly 2287 includes a first collar 2296 and a second collar 2298 spaced from the first collar 2296 along the longitudinal axis 2299 at an opposite end of the threaded portion 2295. In FIG. 14, the first collar 2296 is positioned below the threaded portion 2295 and the second collar 2298 positioned above the threaded portion 2295. The first collar 2296 and the second collar 2298 allow the worm shaft 2294 to rotate about the longitudinal axis 2299 while, at the same time, inhibit or prevent the worm shaft 2294 from being displaced along the longitudinal axis 2299 (i.e. moving up or down).

Since the threaded portion 2295 of the worm shaft 2294 is drivingly engaged with teeth 2289 of the worm gear 2288, the rotation of the worm shaft 2294 causes the worm gear 2288 to rotate about shaft 2245. In the illustrated example, the cable receiving aperture 2292 is positioned proximate to the perimeter of the worm gear 2288. Accordingly, when worm gear 2288 is rotated about shaft 2245, the angular position of the cable receiving aperture 2292 relative to shaft 2245 (and thus relative to second horizontal link axis B) is adjusted. In this way, rotating the worm shaft 2294 varies the effective length, and thus the tension, of spring 2265 by adjusting the position of the cable receiving aperture. For example, in FIG. 14, adjusting the position of the cable receiving aperture 2292 to a location 2292' would result in the tension spring 2265 being under less tension since the effect length of the tension spring 2265 would be shorter.

Preferably, the cable receiving aperture 2292 is provided proximate to the perimeter of the worm gear 2288 to allow for an increased tension adjustment per degree of worm gear 2288 rotation. However, in alternative embodiments the cable receiving aperture 2292 may be positioned proximate the central aperture 2290.

Optionally, the worm gear 2288 may include a cog 2291 that interrupts the plurality of teeth 2289 positioned around the perimeter of the worm gear 2288, thereby inhibiting or preventing the worm shaft 2294 from being rotated too far in one direction. An advantage of this design is that this may prevent cable 2264 from being wrapped around itself.

As shown in FIG. 14, the second end 2268 of the tension spring 2265 is coupled to the display support member 1240 via the cable 2264. However, the effective location of the force applied to the display support member 2240 by the tension spring 2265 is where the cable 2265 tangentially contacts the worm gear 2288. This location (i.e. the location of the fifth horizontal axis E) is preferably positioned below the second horizontal link axis B and laterally offset from the second horizontal link axis B towards the second end 2204 of the linkage assembly 2200.

Notably, the effective location of the force applied to the display support member 2240 by the tension spring 2265 is substantially constant regardless of the relative angular position of the cable receiving aperture 2292 relative to shaft 2245. Accordingly, the tension of the spring 2265 may be adjusted without substantially moving the effective location of the force applied to the display support member 2240 by the tension spring 2265 (i.e. the relative location of the fifth horizontal axis E).

As noted above, tension spring 2265 is biased towards a contracted state. Accordingly, in the illustrated configuration, if the end 2261 of extension stem 2262 is taken as being fixed at the second horizontal link axis C, tension spring 2265 exerts a force on the display support member 2240 at the axis of rotation E, in a direction along the longitudinal axis of the tension spring 2265. This spring force imparts a moment on display support member 2240, which, due to the four bar linkage or parallelogram between axes A, B, C, and D, results in an upwards or vertical force component that urges the display support member 2240 upwardly.

The principles of the spring mechanism in counterbalancing the weight of the supported display 20 as described above with reference to linkage assembly 1200 similarly apply to linkage assembly 2200.

Optionally, one or more friction tacks 2206 can be inserted into one or more friction tack apertures 2208 at the first end 2212 of the first arm 2210 (see FIG. 15). In use, the friction tacks 2208 can provide a predetermined amount of friction between first end 2212 of the first arm 2010 and the pivoting base member 2230, thereby controlling the amount of force needed to rotate the linkage assembly 2200 relative to the pivoting base member 2230.

Optionally, a pair of adjustable friction caps 2258 can be provided to selectively vary the amount of force needed to rotate the linkage assembly 2200 relative to the pivoting base member 2230. Each friction cap 2258 of the pair of adjustable friction caps 2258 is inserted into a respective friction cap aperture 2259 positioned on opposite sides of the first end 2212 of first arm 2210 (see FIG. 15). A tapered set screw 2256 can be inserted through a set screw aperture 2257 formed on the underside of the first end 2012 of first arm 2010 (see FIG. 16) and into a gap between the friction caps. As the set screw 2256 is advanced upwardly, the friction caps 2258 are forced outwardly, thereby providing more friction between the first end 2012 of first arm 2010 and the pivoting base member 2230.

Referring again to FIG. 10, the pivoting display member 1340 can be pivotally coupled to the display support member 2240, such that the pivoting display member 1340 (and thus the display 20) can be rotated about a vertical axis with respect to the display support member 2240. In the illustrated example, the pivoting display member 1340 has a downward projection 1342 that is positioned in a vertical bore 2249 of display support member 2240, e.g. positioned in an axial bore 2255 of a bushing 2250 (see e.g. FIGS. 12 and 15). It will be appreciated that the pivoting display member 1340 may be pivotally coupled to display support member 2240 using any other suitable coupling method, or it may be coupled to display support member 2240 in a fixed orientation.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An apparatus for supporting a display in a plurality of positions between a lower position and an upper position, the apparatus being removably securable to a furniture piece, the apparatus comprising:
- a base support having a lower end and an upper end, the lower end being securable to the furniture piece;
- a display support member having a bracket configured to be secured to the display; and
- a linkage assembly having a first end coupled to the upper end of the base support and a second end coupled to the display support member, the linkage assembly comprising:
    - a first link member having a first end rotationally coupled to the upper end of the base support and rotatable about a first horizontal link axis, and a second end rotationally coupled to the display support member and rotatable about a second horizontal link axis;
    - a second link member having a first end rotationally coupled to the upper end of the base support and rotatable about a third horizontal link axis positioned above the first link axis, and a second end rotationally coupled to the display support member and rotatable about a fourth horizontal link axis positioned above the second link axis;
        - wherein the third link axis is offset from the first link axis towards the first end of the first link member, and
        - wherein the fourth link axis is offset from the third link axis towards the first end of the first link member, and
    - a tension spring having a first end rotationally coupled to the upper end of the base support and rotatable about the third link axis, and a second end rotationally coupled to the display support member and rotatable about a fifth horizontal link axis positioned below the second link axis and offset from the second link axis towards the second end of the first link member;
- wherein, in the lower position, the display support member is below the upper end of the base support, and the first and second ends of the spring are separated by a first distance,
- wherein, in the upper position, the display support member is above the upper end of the base support, and the first and second ends of the spring are separated by a second distance that is less than the first distance,
- wherein, in each of the plurality of positions, a vertical component of an upward force exerted on the display support member by the linkage assembly is substantially constant, and
- wherein, when viewed from a plane orthogonal to the fourth link axis, the fourth link axis, the second link axis, and the fifth link axis are substantially aligned.

2. The apparatus of claim 1, wherein the base support further comprises a pivoting base member rotationally coupled to the upper end of the base support and rotatable about a vertical base axis, and wherein the first end of the linkage assembly is coupled to the pivoting base member.

3. The apparatus of claim 1, wherein the display support member further comprises a pivoting display member rotationally coupled to the bracket and rotatable about a vertical display axis, and wherein the second end of the linkage assembly is coupled to the pivoting display member.

4. The apparatus of claim 1, wherein the display support member further comprises a tilting display member rotationally coupled to the bracket and rotatable about a horizontal display axis, and a wherein the second end of the linkage assembly is coupled to the tilting display member.

5. The apparatus of claim 1, wherein the display support member further comprises a tilting display member rotationally coupled to the bracket and rotatable about a horizontal display axis, and a pivoting display member rotationally coupled to the tilting display member and rotatable about a vertical display axis, and wherein the second end of the linkage assembly is coupled to the pivoting display member.

6. The apparatus of claim 1, further comprising a tension adjustment mechanism configured to selectively vary a tension of the spring.

7. The apparatus of claim 6, wherein the tension adjustment mechanism comprises a cap screw at the first end of the spring, and wherein a drive end of the cap screw is accessible in the lower position.

8. The apparatus of claim 6, wherein the tension adjustment mechanism comprises a worm gear assembly.

9. The apparatus of claim 8, wherein the worm gear assembly comprises:
a worm gear positioned at the second end of the linkage assembly and operably coupled to the second end of the spring; and
a worm shaft drivingly engaged to the worm gear such that rotating a drive end of the worm shaft results in rotation of the worm gear, whereby the tension of the spring is varied,
wherein the drive end of the worm shaft is accessible in both the lower position and the upper position.

10. The apparatus of claim 9, wherein the worm shaft is disposed within the display support member.

11. The apparatus of claim 9, wherein the worm shaft further comprises a first collar and a second collar positioned at opposite ends of the worm shaft, the first collar and the second collar being configured to inhibit the worm shaft from being displaced along a longitudinal axis of the worm shaft.

12. The apparatus of claim 9, wherein the drive end of the worm shaft is configured to receive a hex head tool.

13. The apparatus of claim 1, wherein the first link member comprises a pair of side walls each having upper and lower edges and a connecting web extending between the upper edges of the side walls, and wherein the second link member and the spring are positioned between the side walls.

14. The apparatus of claim 13, wherein the second link member comprises a pair of second link members positioned on opposing sides of the spring.

15. The apparatus of claim 13, further comprising a cord management clip removably positionable between the lower edges of the side walls.

16. The apparatus of claim 1, further comprising a clamp coupled to the lower end of the base support for securing the apparatus to the furniture piece.

17. An apparatus for supporting a display in a plurality of positions between a lower position and an upper position, the apparatus being removably securable to a furniture piece, the apparatus comprising:
a base support having a lower end and an upper end, the lower end being securable to the furniture piece;
a display support member having a bracket configured to be secured to the display;
a linkage assembly having a first end coupled to the upper end of the base support and a second end coupled to the display support member, the linkage assembly comprising:
a first link member having a first end rotationally coupled to the upper end of the base support and rotatable about a first horizontal link axis, and a second end rotationally coupled to the display support member and rotatable about a second horizontal link axis;
a second link member having a first end rotationally coupled to the upper end of the base support and rotatable about a third horizontal link axis positioned above the first link axis, and a second end rotationally coupled to the display support member and rotatable about a fourth horizontal link axis positioned above the second link axis;
wherein the third link axis is offset from the first link axis towards the first end of the first link member, and
wherein the fourth link axis is offset from the third link axis towards the first end of the first link member, and
a tension spring having a first end rotationally coupled to the upper end of the base support and rotatable about the third link axis, and a second end rotationally coupled to the display support member and rotatable about a fifth horizontal link axis positioned below the second link axis and offset from the second link axis towards the second end of the first link member; and
a tension adjustment mechanism configured to selectively vary a tension of the spring, the tension adjustment mechanism comprising a worm gear assembly,
wherein, in the lower position, the display support member is below the upper end of the base support, and the first and second ends of the spring are separated by a first distance,
wherein, in the upper position, the display support member is above the upper end of the base support, and the first and second ends of the spring are separated by a second distance that is less than the first distance, and
wherein, in each of the plurality of positions, a vertical component of an upward force exerted on the display support member by the linkage assembly is substantially constant.

18. The apparatus of claim 17, wherein, when viewed from a plane orthogonal to the fourth link axis, the fourth link axis, the second link axis, and the fifth link axis are substantially aligned.

19. The apparatus of claim 17, wherein the base support further comprises a pivoting base member rotationally coupled to the upper end of the base support and rotatable about a vertical base axis, and wherein the first end of the linkage assembly is coupled to the pivoting base member.

20. The apparatus of claim 17, wherein the display support member further comprises a pivoting display member rotationally coupled to the bracket and rotatable about a vertical display axis, and wherein the second end of the linkage assembly is coupled to the pivoting display member.

21. The apparatus of claim 17, wherein the display support member further comprises a tilting display member rotationally coupled to the bracket and rotatable about a horizontal display axis, and a wherein the second end of the linkage assembly is coupled to the tilting display member.

22. The apparatus of claim 17, wherein the display support member further comprises a tilting display member rotationally coupled to the bracket and rotatable about a horizontal display axis, and a pivoting display member rotationally coupled to the tilting display member and rotatable about a vertical display axis, and wherein the second end of the linkage assembly is coupled to the pivoting display member.

23. The apparatus of claim 17, wherein the worm gear assembly comprises:
a worm gear positioned at the second end of the linkage assembly and operably coupled to the second end of the spring; and
a worm shaft drivingly engaged to the worm gear such that rotating a drive end of the worm shaft results in rotation of the worm gear, whereby the tension of the spring is varied,
wherein the drive end of the worm shaft is accessible in both the lower position and the upper position.

24. The apparatus of claim 23, wherein the worm shaft is disposed within the display support member.

25. The apparatus of claim 23, wherein the worm shaft further comprises a first collar and a second collar positioned at opposite ends of the worm shaft, the first collar and the second collar being configured to inhibit the worm shaft from being displaced along a longitudinal axis of the worm shaft.

26. The apparatus of claim 23, wherein the drive end of the worm shaft is configured to receive a hex head tool.

27. The apparatus of claim 17, wherein the first link member comprises a pair of side walls each having upper and lower edges and a connecting web extending between the upper edges of the side walls, and wherein the second link member and the spring are positioned between the side walls.

28. The apparatus of claim 27, wherein the second link member comprises a pair of second link members positioned on opposing sides of the spring.

29. The apparatus of claim 27, further comprising a cord management clip removably positionable between the lower edges of the side walls.

30. The apparatus of claim 17, further comprising a clamp coupled to the lower end of the base support for securing the apparatus to the furniture piece.

* * * * *